(12) United States Patent
Magpayo

(10) Patent No.: US 12,120,422 B2
(45) Date of Patent: Oct. 15, 2024

(54) SYSTEMS AND METHODS FOR CAPTURING AND DISPLAYING MEDIA DURING AN EVENT

(71) Applicant: UR-Take, Inc., Mountain View, CA (US)

(72) Inventor: Genofre Magpayo, Mountain View, CA (US)

(73) Assignee: UR-Take, Inc., Mountain View, CA (US)

( * ) Notice: Subject to any disclaimer, the term of this patent is extended or adjusted under 35 U.S.C. 154(b) by 0 days.

(21) Appl. No.: 17/573,118

(22) Filed: Jan. 11, 2022

(65) Prior Publication Data

US 2022/0132020 A1 Apr. 28, 2022

Related U.S. Application Data

(63) Continuation-in-part of application No. 15/707,630, filed on Sep. 18, 2017, now abandoned.
(Continued)

(51) Int. Cl.
*H04N 23/611* (2023.01)
*G06V 20/52* (2022.01)
(Continued)

(52) U.S. Cl.
CPC .......... *H04N 23/661* (2023.01); *G06V 20/52* (2022.01); *H04N 23/611* (2023.01); *H04N 23/62* (2023.01); *H04N 23/64* (2023.01); *H04N 23/951* (2023.01)

(58) Field of Classification Search
CPC .......... H04N 5/23206; H04N 5/23216; H04N 5/23219; H04N 5/23222; H04N 5/23232; H04N 5/23293; H04N 5/247; H04N 5/2624; H04N 21/2143; H04N 21/21805; H04N 21/4126; H04N 21/4223; H04N 21/4367; G06V 20/52
See application file for complete search history.

(56) References Cited

U.S. PATENT DOCUMENTS

| 2004/0012810 A1* | 1/2004 | Haas | H04N 7/181 |
| | | | 348/E7.086 |
| 2012/0057039 A1* | 3/2012 | Gardiner | H04N 5/23219 |
| | | | 348/222.1 |

(Continued)

*Primary Examiner* — Cesar B Paula
*Assistant Examiner* — Zelalem Shalu
(74) *Attorney, Agent, or Firm* — FisherBroyles, LLP; Gregory T. Fettig

(57) ABSTRACT

Systems and methods herein provide for capturing and displaying media during an event. One system includes multiple camera devices, each being configured at a location of the event and comprising a global positioning module (GPS) operable to identify the camera device's location. A server is communicatively coupled to a computing device, a display device, and the camera devices through a wireless router using a secure wireless protocol that establishes a secure local area network (LAN) to prevent intrusion to the devices. The server is operable to receive images captured by the camera devices over the LAN, to transfer the images to the computing device for vetting, and to display vetted images on the display device. The server may also control the camera devices and/or provide automatic image processing to the images captured by the camera devices.

16 Claims, 25 Drawing Sheets

Related U.S. Application Data

(60) Provisional application No. 62/433,960, filed on Dec. 14, 2016.

(51) Int. Cl.
*H04N 23/60* (2023.01)
*H04N 23/62* (2023.01)
*H04N 23/661* (2023.01)
*H04N 23/951* (2023.01)

(56) References Cited

U.S. PATENT DOCUMENTS

| | | | |
|---|---|---|---|
| 2012/0265758 A1* | 10/2012 | Han | G06F 16/48 707/E17.089 |
| 2013/0198829 A1* | 8/2013 | Bund | H04L 63/029 726/11 |
| 2014/0176733 A1* | 6/2014 | Drooker | G06Q 10/06 348/207.1 |
| 2014/0186004 A1* | 7/2014 | Hamer | G11B 27/32 386/223 |
| 2015/0036004 A1* | 2/2015 | Harwell | H04M 1/72451 715/753 |
| 2015/0153808 A1* | 6/2015 | Nakai | H04N 1/00891 358/1.14 |
| 2016/0094773 A1* | 3/2016 | Maciuca | H04N 23/62 348/207.11 |
| 2016/0205358 A1* | 7/2016 | Dickinson | H04N 7/188 348/157 |
| 2017/0178372 A1* | 6/2017 | Gormish | G06K 9/6215 |
| 2019/0208130 A1* | 7/2019 | Hara | H04N 5/04 |

* cited by examiner

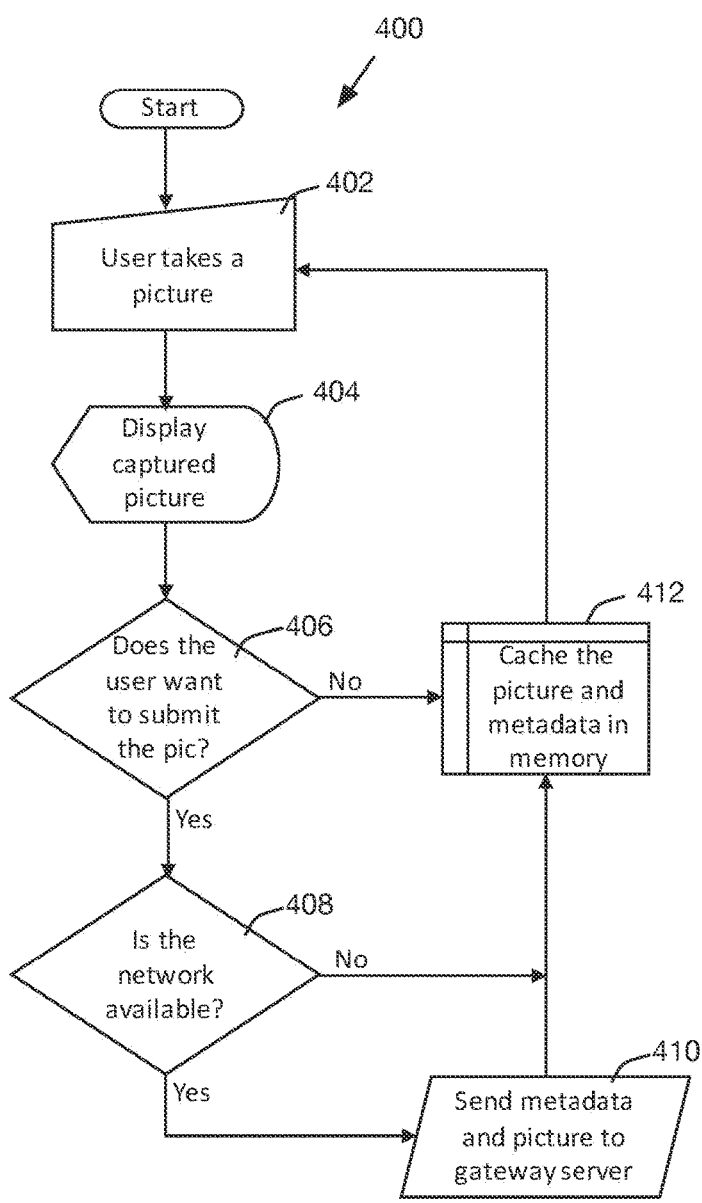
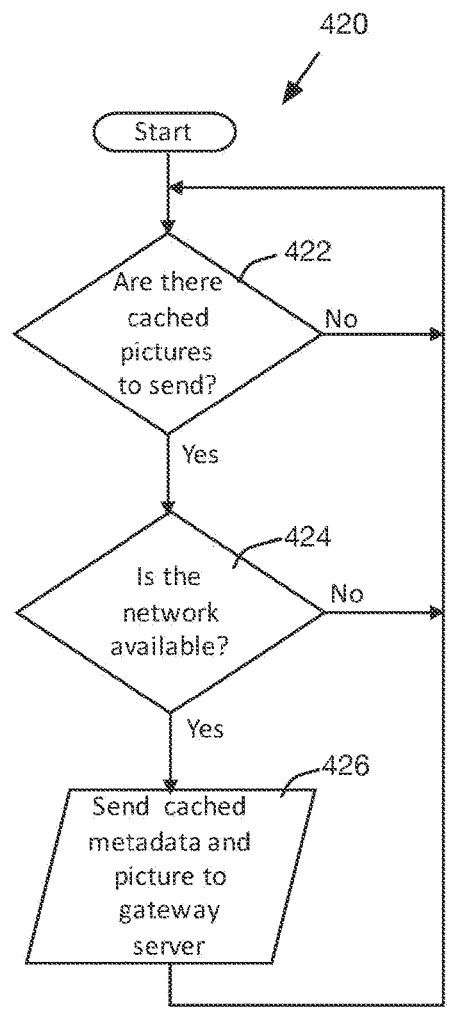
FIG. 4A
FIG. 4B

SYSTEMS AND METHODS FOR CAPTURING AND DISPLAYING MEDIA DURING AN EVENT

CROSS REFERENCE TO RELATED APPLICATIONS

This patent application is a continuation-in-part patent application claiming priority to, and thus the benefit of an earlier filing date from U.S. patent application Ser. No. 15/707,630 (filed Sep. 18, 2017), which claims priority to U.S. Provisional Patent Application No. 62/433,960, filed Dec. 14, 2016, each of which is hereby is incorporated by reference.

BACKGROUND

Systems, devices and methods for photographing, video recording and publishing digital contents of events are well known. Pictures and other digital content are captured by event photographers using both film and digital cameras while event attendees commonly use the digital cameras on their mobile phones. Additionally, for events such as a wedding event, disposable film cameras may be distributed with the intention of wedding guests to shoot pictures which are later collected and processed post-event. In the end, a large amount of post-event digital content can be collected from event attendees and other sources which is then stored, organized, published and possibly re-sold (as prints) using cloud storage systems and social media platforms such as Twitter.com, Facebook.com, Shutterfly.com, Snapfish.com and Instagram.com to name a few.

These systems are primarily designed to manipulate and share digital content of an event with the masses. To be a participant of an event that either contributes the digital content as well as consumes the content, these systems require the individual contributors and viewers to register themselves and/or their devices with a system, typically a cloud application, so they can upload and share their images. These pre-requisites as well as the general process of uploading the content can be time-consuming, prone to user error, prone to connectivity issues with the cloud application and can be disruptive to the focus of an event.

Additionally, to participate with these applications, whether contributing or viewing the digital content, users must have their own mobile device and must each register with the application, in turn requiring that each user have a connection to the internet or to their mobile cell provider, and they must be willing to use their device to participate, possibly leading to additional data transfer charges. This can be limiting to hoster(s) of an event that do not want to or cannot provide internet access. Likewise, not every event attendee wants to, or has access to, a mobile device, excluding them from this form of collaboration. Additionally, given the nature of most social media platforms, the digital content being shared is shared globally, leaving open concerns regarding security and privacy of the event. In cases where security and privacy are a concern, mobile devices may be confiscated or disallowed and digital photos are limited to authorized photographers.

Some available systems are designed for the collection, inspection and redistribution of photos after the event. The focus of such inventions being to provide a means for a photographer or photographer service to upload photos to a website where guests can then access them for download, purchase and viewing on their pc or mobile device. These systems are specific to the digital contributions from a selected photographer or the photographer service.

Other available systems allow for an in-event presentation of pre-defined digital content as well as a means for supporting ecommerce of that content while at the event. The focus of such inventions is to provide a center-piece display by which a pre-defined slideshow, video or stream can be broadcast to the table guests and allow them to place orders for copies of the digital content. Pre-captured content is displayed to the event guests during the event and allows them to register, request and purchase personal copies of the content.

Other known systems and methods collect photos and videos via invitations to simplify the steps used in gathering such digital content to create and manage a digital album of the event. The focus of such inventions is to automate the creation of a digital album.

Other known approaches include a wedding ceremony information distribution system for the video capture of wedding ceremonies and the replaying of the video to prescribed destination points during the wedding reception and post-wedding. As with other systems mentioned above, digital content captured during the event by a specific photographer or photographer service can be replayed during the event. Individual users can capture and post pictures on social media, sharing information globally. Post-event, digital captures can be collected by numerous sources for consolidation and organization into an album system for viewing afterwards. For security reasons, some events may not permit the taking of photographs by individual participants.

In short, while social media and other technologies exist to proliferate the sharing of digital content, there are challenges at an event, such as a wedding, to enable all participants at the event to easily partake in the capturing of photographs and displaying these photographs for all participants to view real time. Additionally, if the event hoster wishes to prevent photos of the event from being publicly viewed, then typical social media applications and individual mobile devices for personal photos are disallowed. Finally, with social media and other event applications, the publication of pictures is left to the discretion of the contributor.

Thus, there remains a need for improved systems and methods for secure collaborative media presentations, including a local system for securely coordinating different image capture devices at an event so that images captured may be vetted and redisplayed for all participants to view in near real-time.

SUMMARY

Systems and methods herein provide for capturing and displaying media during an event. In one embodiment, a system includes a computing device, a display device, a server, a wireless router, and a plurality of camera devices with each camera device being configured at a location of an event and comprising a global positioning module (GPS) operable to identify the camera device's location. The server is communicatively coupled to the computing device, the display device, and the camera devices through the wireless router using a secure wireless protocol that establishes a secure local area network (LAN) to prevent intrusion to the computing device, the display device, the camera devices, and/or the server by devices or systems that are external to the LAN. The server is also operable to receive images captured by the camera devices over the LAN, to transfer the images to the computing device for vetting, and to display vetted images on the display device. The server is also operable to detect activity at the event based on a number of images being captured by a first of the camera devices, to direct at least a portion of the camera devices of the plurality to automatically capture an image of a scene of the activity, to identify a feature in the images of the scene captured by the portion of the camera devices, to stitch the images of the scene into a single image, to transfer the single image to the computing device for vetting, and to display the single image on the display device during the event after vetting by the computing device.

Also described herein are systems and methods for secure collaborative media presentations. Some embodiments relate to a process for securely coordinating different image capture devices at an event so that images captured may be vetted and redisplayed for all participants to view in near real-time. For example, some embodiments include a group of image capture devices, wirelessly communicating to a remote server called a gateway server. The gateway server may coordinate the capture of images from the various capture devices and provide a user interface for a vetting process by which an event hoster can view and select which captured images will be published and displayed to everyone. The hoster maintains the integrity of the event by approving the images for publication and display. In such embodiments, the gateway server may incorporate the approved images into a continuous slideshow that is projected for all participants to view.

In some embodiments, the gateway server may also communicate over a network to one or more remote servers, for example located in the cloud, referred to herein as the hosting server. The hosting server is responsible for the storage of all images captured, management of those images and republication or broadcast of the approved event images for internet consumption purposes. The hosting server can also integrate with existing social media platforms and publish images to these applications as the event hoster requests or allows for the event.

Advantages of a system and method for a secure collaborative media presentation as shown and described herein may include: allowing the attendees of an event to participate in the photographing of the event for the purposes of viewing these pictures as a slideshow, near real-time, by all the attendees; eliminating the requirement for attendees to register their devices or themselves for participation in the digital contribution for the event; allowing the event hoster to vet the contributed photos prior to the display and/or publication of the photos for the purposes of maintaining the integrity of the event; and/or allowing the event hoster to secure the system such that photographs can be taken, collected and displayed during the event, but not allowed to be viewed outside the event unless permitted.

One example of this embodiment would be for a wedding reception. For each of the tables at the reception, one or more capture devices used by the present system may be available. In some embodiments, guests are not required to register with any systems to utilize the devices. Guests are invited to capture photos of the event occurring at their tables at any times through these capture devices. These devices transmit the captured photos to the gateway server where an event hoster decides which images to publish and orders them into the slideshow. Large projection displays are located at one or more areas in the reception. The gateway server projects the slideshow, near real-time, for everyone's viewing, inviting a more collaborative, fun, and memorable event.

In some embodiments, an interactive event media presentation system and method for coordinating the capture of digital images from a plurality of capture devices at an event and redisplaying said images as a continuous slideshow, near real-time to an audience of the event, may be provided. Such system may include a computer system at the event and one or more capture devices having components and software for capturing digital images and wirelessly transmitting the digital images to a server. In some embodiments, the system may allow each capture device to capture digital images and cache them locally, and may allow the user of each capture device to choose which captured images will be transmitted wirelessly to the server. In some embodiments, the system and method may further include the transmitting of metadata such as, time/date of event, ID and GPS location of the capture device for each captured image that is selected for transmittal to the server, and may include a method for the review and selection of captured images on the server, for example wherein the method allows a user that is monitoring the server to review each transmitted digital image and manually select and order which images will be used in the slideshow. In some embodiments, a monitor, digital projector and screen, or other means (e.g., including software instructions) for projecting and/or displaying the slideshow to the audience may be included, for example wherein the means projects the selected images to a large display at the event as well as displaying the selected images back to the capture devices. In some embodiments, systems and methods herein may further include a means for securing a wireless connection between said server and said capture devices, for example wherein the interactive event media presentation system captures and displays said images in near real time. In some embodiments, the capture devices may be mobile computing devices such as tablets and mobile phone devices. In some embodiments, the event may be a physical event at a physical location, a virtual event without a physical location, or a combination thereof. In some embodiments, an interactive event media presentation system in accordance with the present disclosure may interface with online services for the purposes of image storage, image redistribution, and integration with other social media services.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

The various embodiments disclosed herein may be implemented in a variety of ways as a matter of design choice. For example, some embodiments herein are implemented in hardware, whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

FIG. 4A is a flowchart depicting example image capture logic that may be executed on each capture device when taking and submitting pictures.

FIG. 4B is another flowchart depicting image transmittal logic that may be executed on each capture device when taking and submitting pictures in the example embodiment of FIG. 4A.

DETAILED DESCRIPTION OF THE FIGURES

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Described herein are systems and methods for providing secure collaborative media presentations. In the following description, for purposes of explanation, numerous examples and specific details are set forth in order to provide a thorough understanding of the aspects of the systems and methods. It will be evident, however, to one skilled in the art that the present invention as defined by the claims may include some or all of the features in these examples alone or in combination with other features described below, and may further include modifications and equivalents of the features and concepts described herein.

Embodiments of the present system will now be described with reference to FIGS. 1A-5B, which in general relate to a system for coordinating the collaboration and capturing of different image capture devices at an event so that images captured by the devices are consolidated, vetted for publication and then displayed to an audience of the event. The description for FIG. 6 relates to an example hardware embodiment of a capture device that may be employed in the present systems, and FIGS. 7-11B relate to example user interface screens illustrating various features of example capture devices and host/administration systems.

Figure 1A:
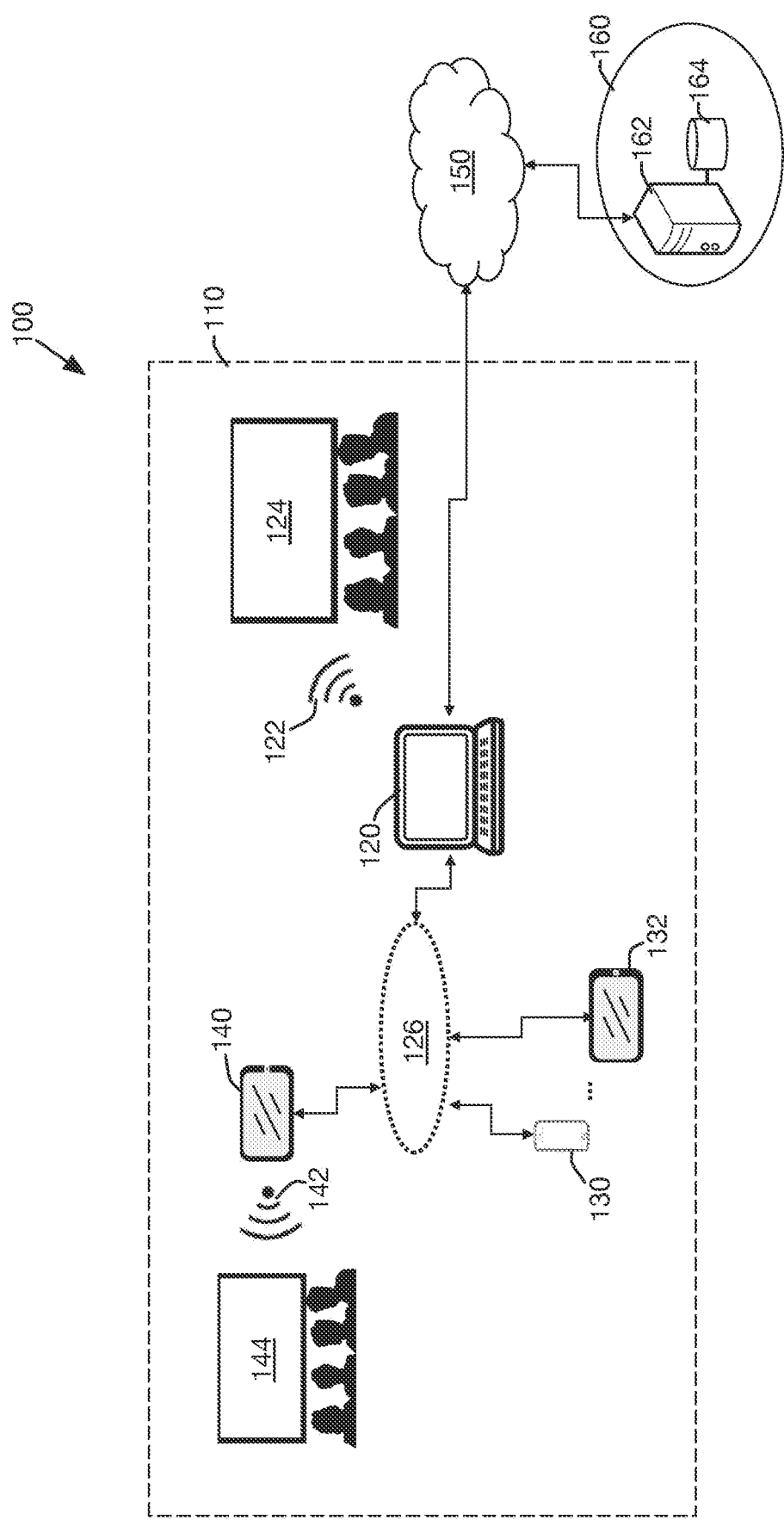
FIG. 1A is a schematic illustration of the overall architecture of a secure collaborative media presentation system at an event, in accordance with an example embodiment.

FIG. 1A illustrates the overall architecture of a secure collaborative media presentation system 100 at an event in accordance with an example embodiment. Perimeter 110 is used to indicate a closed or contained event such as a wedding reception, a birthday party, a company meeting or event. Capture devices 130, 132 are devices such as tablets, mobile phones, or other devices capable of capturing pictures as well as executing the capture steps defined in FIGS. 4A-4B. In some embodiments, capture devices 130, 132 may also be used to display photos that have been vetted and "published" to the event by a host. Any desired number of capture devices may be used, e.g., one for each guest at an event. In this example, device 140 may be a tablet, smart phone, or other computer device used as a remote display agent, as described in more detail below.

Each of the capture devices 130, 132, and optionally a remote display agent 140, may be wirelessly connected over a secure local wireless area network (WAN) 126 to a server 120, also referred to herein as a local host and/or as gateway server 120. The WAN can be comprised of a local wireless router along with additional wireless access points (WAPs) as needed. The WAN 126 may be secured against unpermitted external wireless devices through a combination of router security processes ranging from the use of a non-broadcasted service set id (SSID) to encrypting connections with security options such as Wi-Fi Protected Access 2—Pre-Shared Key (WPA2-PSK) and Media Access Control (MAC) address filtering.

Gateway server 120 may be connected to the WAN 126 and sits between the capture devices 130, 132 and one or more large display systems or devices 124. The gateway server 120 hosts a local database to store and manage captured images transmitted from the capture devices. It allows the event hoster to choose which contributed images will be selected for the event slideshow as explained in FIG. 4A. The gateway server 120 also transmits and projects approved images over a wireless display (WI-DI) connection 122, an HDMI connection, or other wired or wireless communication protocol to display device 124. In some embodiments, display device 124 may comprise a large flat screen display or array of displays, a projection system, and/or other systems for displaying digital images and/or video to an audience at an event. In some embodiments, the gateway server 120 may also send images or video through local WAN 126 or other wired or wireless communication protocol to one or more remote display agents 140, each of which may communicate, for example through a WI-DI or other connection 142, to a second display, or remote display 144. In some embodiments, server 120 may also send images back to the capture devices 130, 132 for display on each device. Additionally, any images transferred back and forth from the capture devices are compressed prior to transmission.

In some embodiments, a system and method for secure collaborative media presentation 100 may include a server 120 configured to communicate over a local network 126 with one or more capture devices 130, 132 to receive images, video or other media (collectively, "media") captured by the capture devices 130, 132 at an event. The server 120 may also communicate with one or more display devices to display the received media. As used herein the term "display system" may include one or more of any combination of display devices, and the term "display device" may be any of primary display 124, one or more display agents 140, each of which may include an integrated screen for displaying media and/or a communication interface for displaying the media on a remote display 144, and one or more capture devices 130, 132. Additionally, all communications (e.g., between server 120 and capture devices 130, 132, display 124, agents 140, and/or hosted server 162 as described below) may be encrypted both in transit and at rest.

In some embodiments, the gateway server 120 can operate in two modes: (1) connected to the internet 150; or (2) in a disconnected mode from the internet. When connected to the internet 150, the gateway server may interface with a hosted system 160, including for example a server 162 which manages user profile information and event information, and a hosted database 164 in communication with the server 162 storing captured images. When disconnected from the internet, the gateway server 120 may serve as a hosted server until it is connected to the internet and can communicate with the hosted server 162.

Figure 1B:
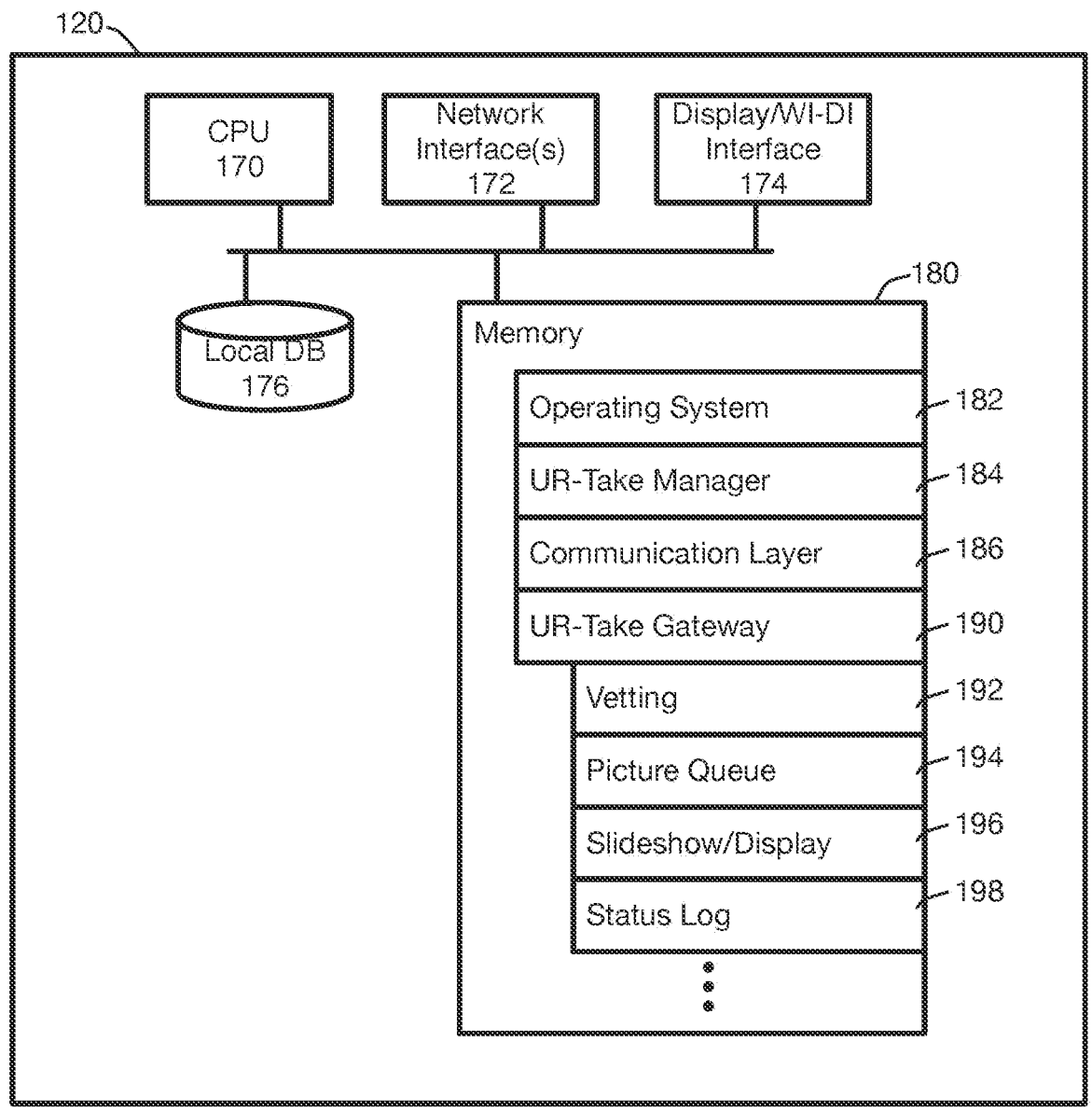
FIG. 1B is a schematic illustration of functional elements of a gateway server.

FIG. 1B is a schematic illustration of a gateway server 120, or local event server, including various components and functional modules in accordance with an example embodiment. For example, server 120 may include a CPU or processor 170 for controlling overall operation of the system, a network interface 172 for communicating over one or more networks (e.g., WAN 126 and/or Internet 150), and a memory 180 for storing information and instructions for performing various operations as described herein. In some embodiments, server 120 may also include a display interface 174, e.g., for 1-to-1 or other secure communication with display device 124. In some embodiments, communication with one or more display devices or display systems may be performed utilizing one or more display interface(s) 174 and/or network interface(s) 172. In some embodiments, server 120 may also include one or more local databases 176, e.g., for storing media, presentations, user information, or other information or data. In some embodiments, local DB 176 may be part of memory 180.

Memory 180 may include information, programs, and/or instructions for performing various actions or processes, shown and described herein for the sake of convenience as functional modules. For example, in some embodiments memory 180 may include an operating system 182, configuration module 184 (shown here as UR-Take Manager 184), a communication layer 186, and media administration system 190 (shown here as UR-Take Gateway 190). Operating system 182 may include information and instructions for overall operating of server 120 and its various hardware and software components. UR-Take Manager 190 may include information and instructions for configuring the server 120 for use at a particular event, e.g. by communicating with hosted server 162 over Internet 150 prior to an event to download event details and other information needed for operation of the server 120 and other elements of system 100 at the event and/or following an event to upload captured images, media, event details, or other information to the hosted server 162. Communication layer 186 may be configured and used for communicating with and/or configuring capture devices 130, 132 and/or agents 140, for example to receive pictures captured and shared by event attendees using the capture devices 130, 132 and/or to display vetted pictures on one or more desired display devices at the event.

In some embodiments, the media administration system, or UR-Take Gateway 190, may include information and instructions for processing photographs or other media captured at an event, including for example receiving digital photographs from capture devices 130, 132, vetting the photographs to select those to be displayed, configuring a slideshow or other presentation of the photographs, and displaying the photographs on a display system at the event. Example functional modules may include a vetting module 192 for use by an event administrator, or hoster, to view and select from the pictures or other media shared by attendees, a picture queue 194 for holding and/or organizing the media to be vetted and/or displayed, a slideshow module 196 for configuring a slideshow of the pictures/media to be displayed at the event, and a status log 198 for logging actions and showing status of the gateway server 120. Example operation of UR-Take Gateway 190 is shown and described in more detail below with respect to FIG. 11A and FIG. 11B.

Figure 2:
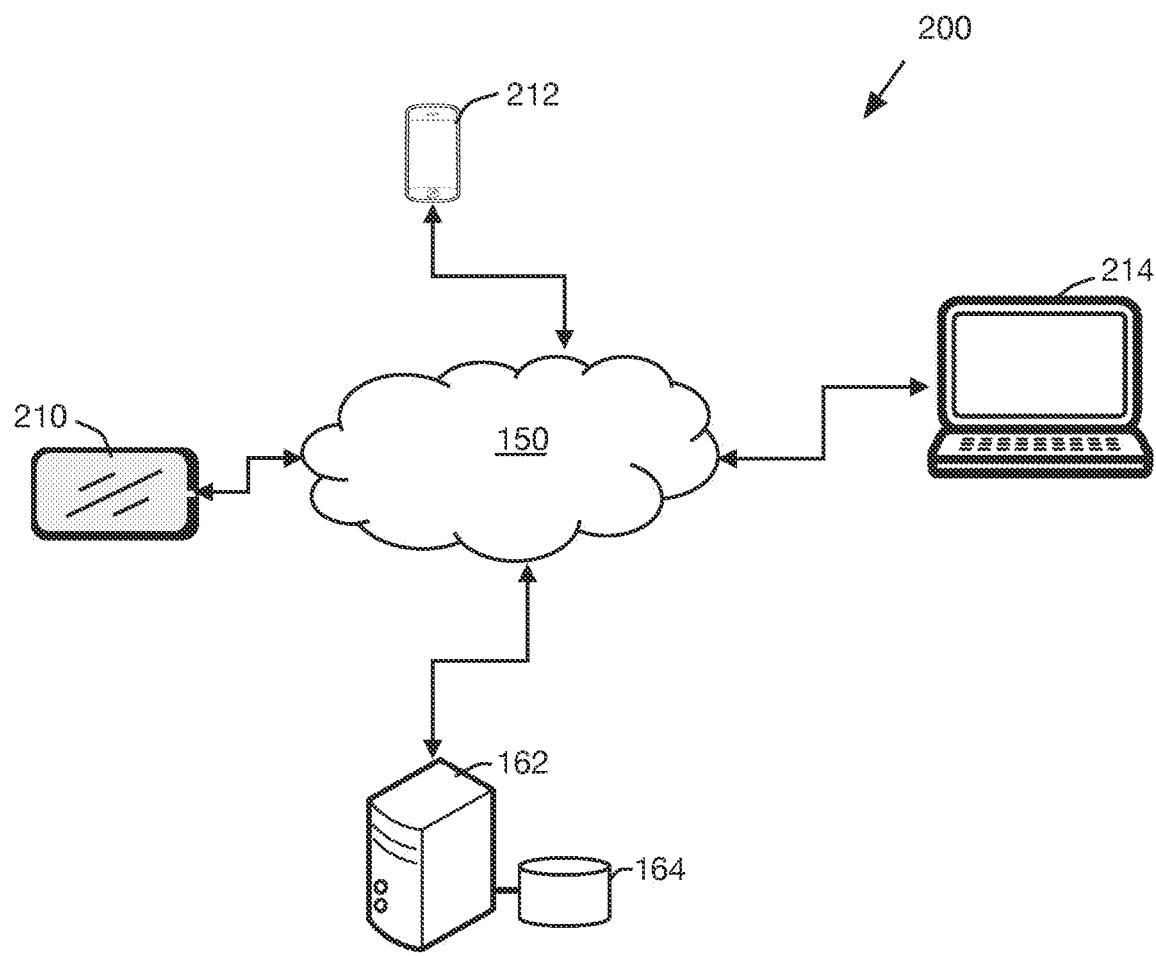
FIG. 2 is a schematic illustration of the overall architecture of a collaborative media presentation system supporting an open or virtual event with mobile capture devices, in accordance with an example embodiment.

FIG. 2 illustrates the overall architecture of an example collaborative media presentation system 200 for a virtual event where the event has no physical location and is open to various mobile devices connecting over the internet 150. Devices such as tablets 210, mobile phones 212, and laptops and PCs 214 connect over open network connections such as mobile service providers, open wireless networks, or direct connection to the internet to act as capture devices for the virtual event. The tablets, mobile phones, and laptops communicate with an internet service provided by a hosted server 162 and its hosted database 164, to contribute captured images and view approved images from other capture devices. In this embodiment, the network used in the event is not secured against external devices allowing all published images to be made available to a plurality of capture devices. Using a laptop 214 or other compute device that is connected to the hosted server 162 allows an event hoster to vet the contributed images from the various capture devices and select which images will be published as part of the event slideshow.

Example methods used by capture devices 130 and 132 to capture digital images, transmit them to the gateway server 120 and display published images sent from the gateway server are described with reference to the flowcharts of FIGS. 3, 4A, and 4B.

Figure 3:
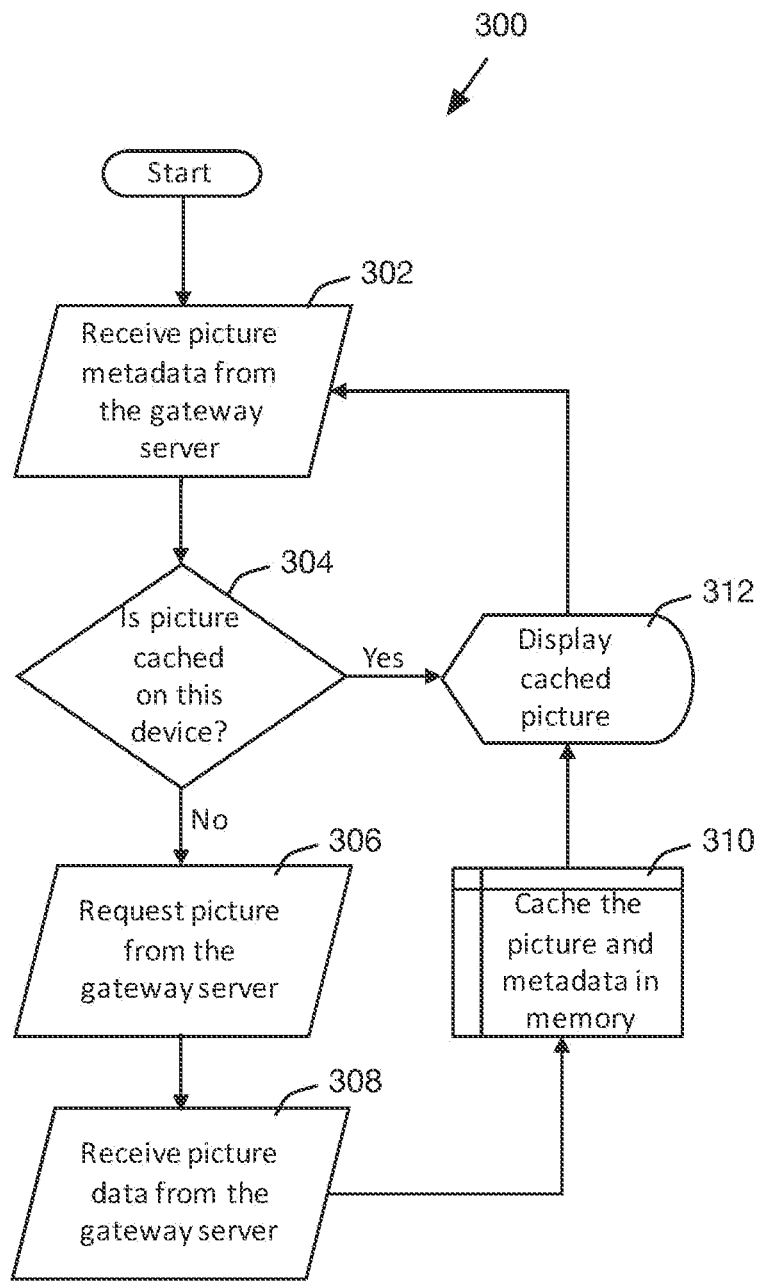
FIG. 3 is a flow chart depicting example image display logic for execution on each mobile capture device or remote display agent.

For example, event display process 300 of FIG. 3 may be a background process running on a remote display device, such as agent 140, and is connected to the gateway server 120, waits to receive 302 a notification from the gateway server that a picture should be displayed, e.g., on the agent/tablet 140 screen or on an associated remote display 144 controlled by the agent 140 over a 1 to 1 wireless link 142. In step 304 the background process checks to see if that image already exists in its local memory cache. If the image is in cache, then the picture is displayed as indicated in step 312 else the background process must request the gateway server to send the picture to the agent as indicated in step 306. In step 308 the process receives the picture and in step 310 the process caches the picture and its metadata in local memory. The picture is then displayed on the agent to display per step 312. In this embodiment, caching the picture and its metadata local to the capture device increases performance of the display activity and minimizes the amount of communication between the agent/display devices and the gateway server as the continuous slideshow is looped and pictures are redisplayed. In some embodiments, one or more capture devices may be configured to receive and display images as described above, e.g., instead of or in addition to the remote display agent.

FIGS. 4A and 4B show example methods 400 and 420, respectively, for image capture processing in a capture device. For example, in step 402 a user takes a picture with the capture device (e.g., device 130 or 132), and the captured picture is displayed 404, for example on the screen of the capture device as shown and described below with respect to FIG. 8A to 8D. The user may have the option to submit the picture to the gateway server (e.g., to server 120 of FIG. 1A over local network 126) in step 406. If the user desires to submit the picture, the system may first check to confirm the network is available 408 before sending metadata and picture to the gateway server in step 410. If the user indicates that he or she does not want to submit the picture in step 406, or if the network is unavailable in step 408, the picture and metadata may be cached in local memory in step 412.

Another background process 420 running on the capture device may be used to process the local cache of pictures mentioned in step 412 of method 400. In step 422 of FIG. 4B, the process checks to see if any cached images should be sent to the gateway server 120. If there are no images to be sent then the process waits until notified else it executes step 424 and checks to see if the connection to gateway server is available. If the connection is available then the picture to be sent is first compressed to reduce network traffic and then step 426 is executed to send the picture and its metadata to the gateway server else the process returns to step 422 where it waits to see if other images should be processed. Should the network and/or the connection to the gateway server be unavailable, it is not without reason that this process could wait on a notification that the connection is available before processing any pictures. In this manner, step 424 may be executed before step 422 possibly preventing a CPU intensive execution loop.

Some methods that may be used by gateway server 120 to vet captured digital images and transmit selected images to a large display 124, to remote displays 144 (e.g., through a remote agent 140 of FIG. 1A), and/or in some embodiments back to the capture devices 130, 132, are described below with reference to the flowcharts of FIGS. 5A, 5B, 5C, and 5D.

Method 500 is an example method for a gateway server to flag a new picture or other media for review by an event host or administrator (also referred to herein as a "hoster"). In step 502, a background process running on the gateway server 120 receives a captured image sent from a capture device such as tablet 130. The received image is the result of the execution of step 410 of FIG. 4A or step 426 of FIG. 4B. Steps 504 and 506 indicate that the gateway server may store the received image and its metadata in a local database containing all the captured images submitted for display at the event. Step 508 sets a notification or flag that a new captured image has been received. In this example method 500, background process 502 then waits for a next image to be received.

Figures 5A, 5B:
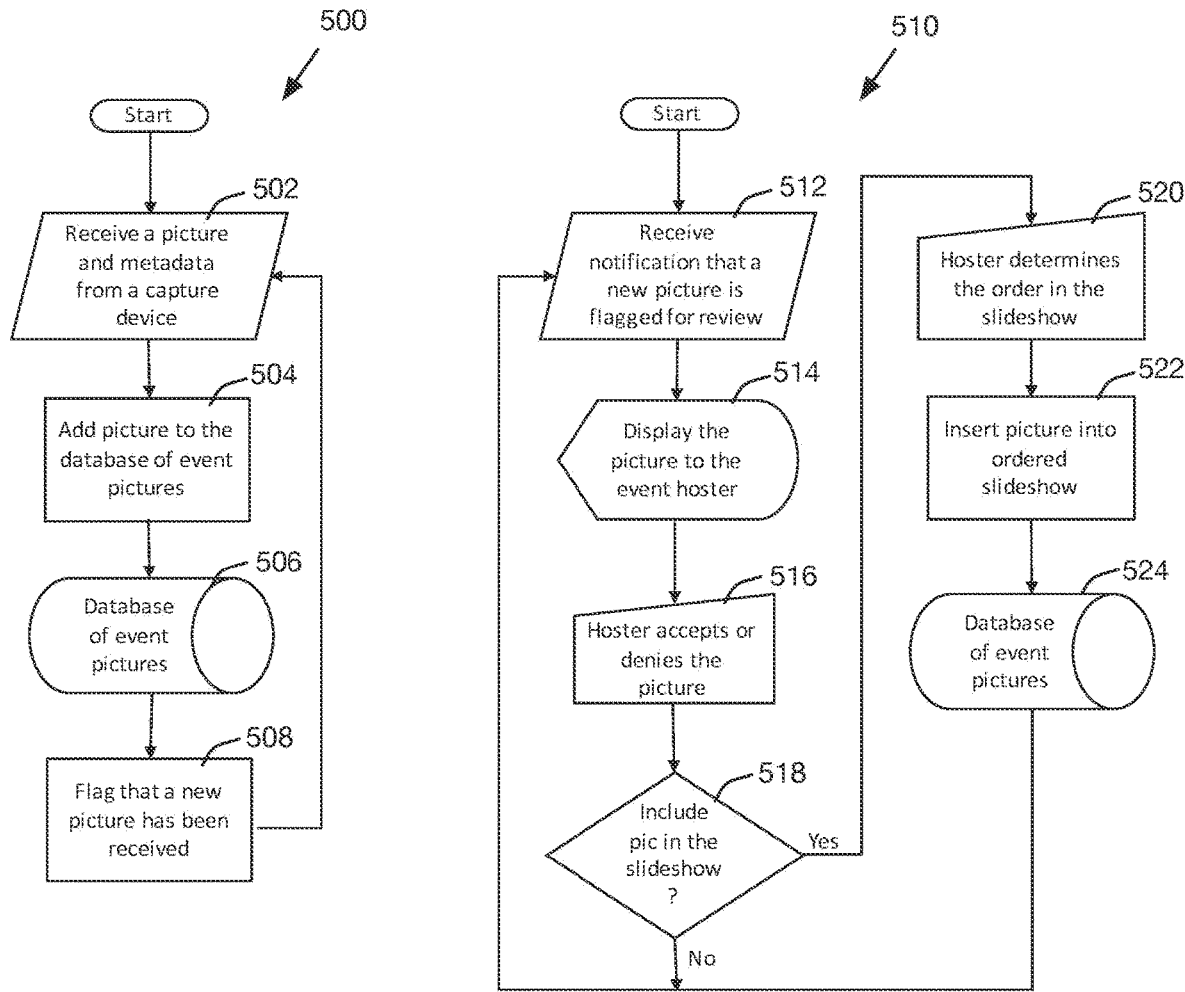
FIG. 5A is a flowchart depicting image display logic that may be executed on the gateway server in an example embodiment.
FIG. 5B is another flowchart of the image vetting logic that is executed on the gateway server of the example embodiment of FIG. 5A.
Figure 11A:
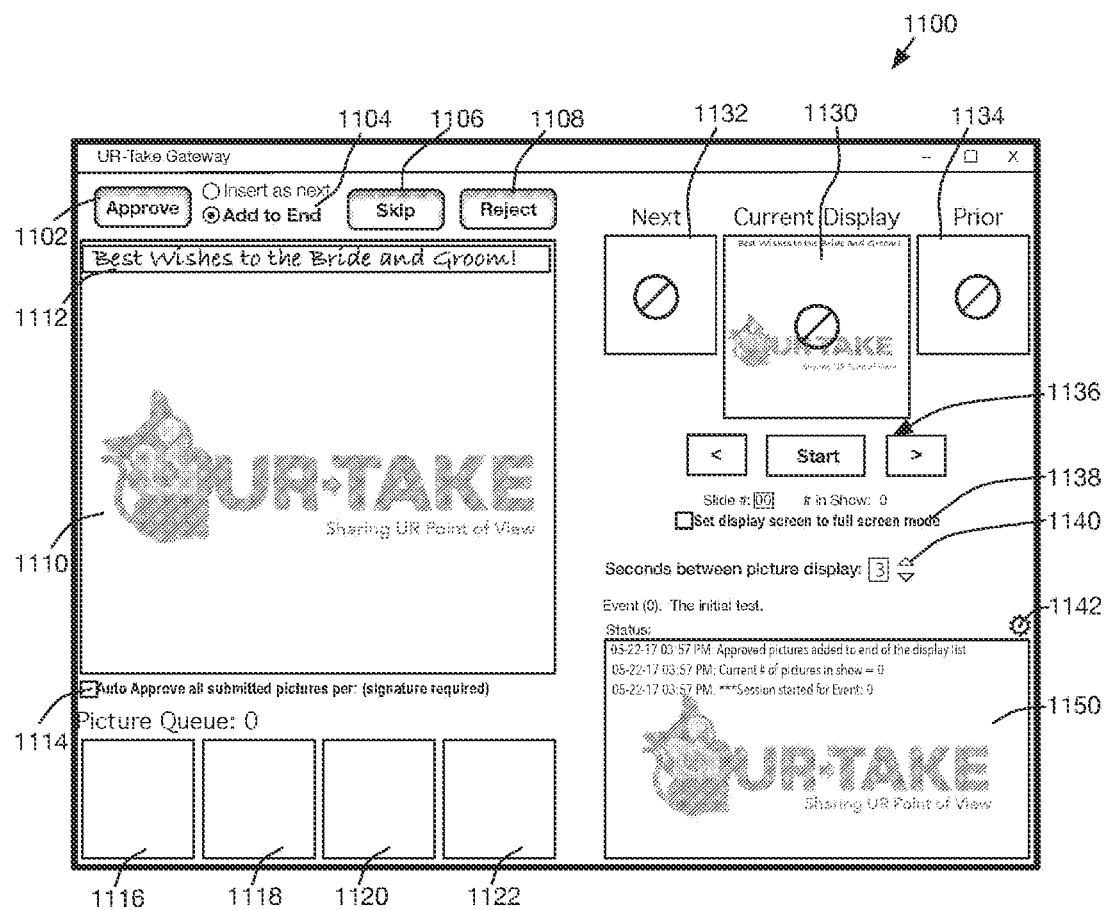
FIG. 11A is a schematic illustration of an example UR-Take Gateway screen of a local host system for vetting and displaying images during an event, in accordance with an example embodiment.
Figure 11B:
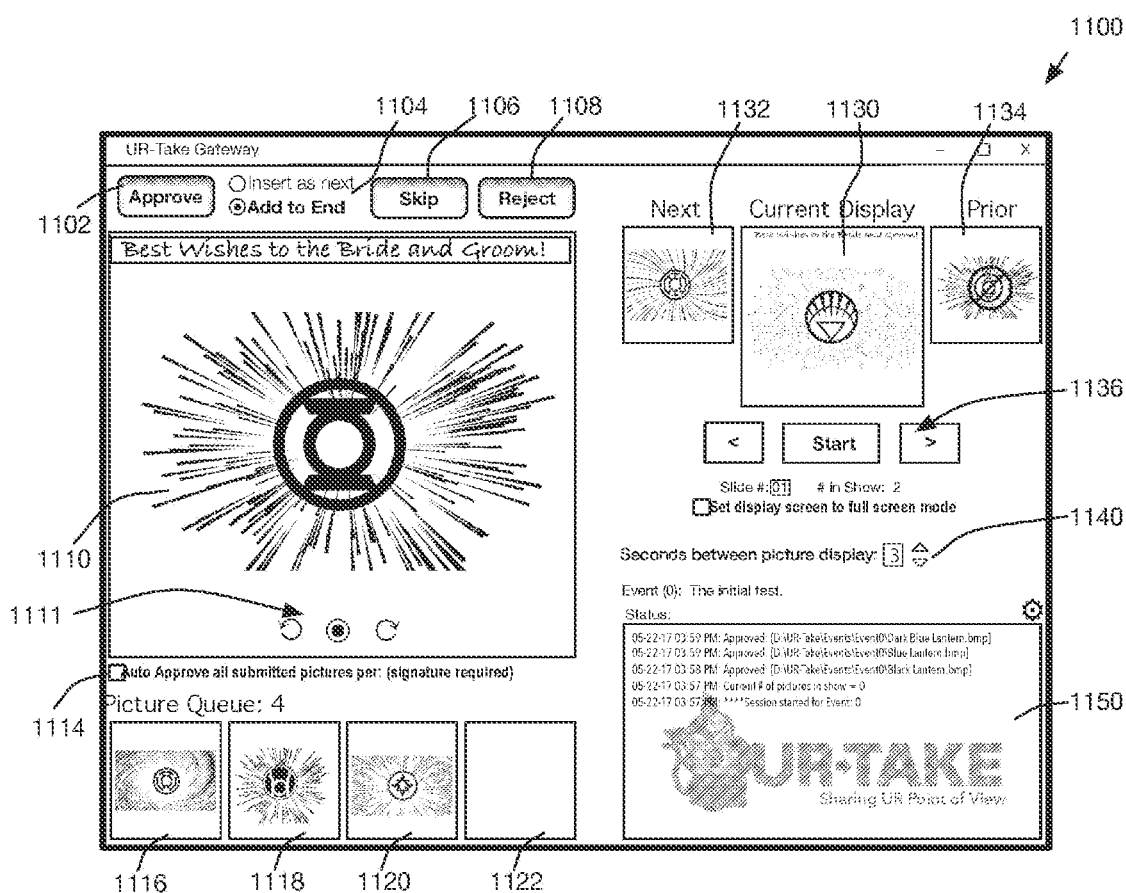
FIG. 11B is a schematic illustration of another view of the example UR-Take Gateway screen of FIG. 11A.

FIG. 5B provides an example method of vetting pictures to be displayed in a slideshow at an event. In step 512, another background process running on the gateway server 120 receives the notification that a new image is stored in the local database. Step 514 indicates that the new image is displayed to the event hoster monitoring the gateway server at the event (e.g., via a UR-Take Gateway interface with vetting features such as shown and described below with respect to FIGS. 11A and 11B). In step 516 the event hoster manually decides whether the new picture will be accepted for display to the audience at the event, e.g., on display device 124 and/or one or more remote agent/displays 144, or other devices in communication with the gateway 120. In some embodiments, pictures and/or a vetted slideshow may be displayed on one or more of the capture devices. If the picture is declined in step 518 then the process returns to step 512 and waits on another notification else in step 520 the event hoster is prompted to manually indicate where in the slideshow the accepted image should be inserted. Steps 522 and 524 indicate that the image is inserted into the slideshow and updated in the database of event pictures. The process then returns to step 512 and waits on another notification. Example gateway server user interface screens for implementing this example vetting method are shown in FIGS. 11A and 11B and described in more detail below.

One skilled in the art will appreciate that, in some embodiments, computer machine learning and predictive analytics techniques may be used to automate the vetting process of the event pictures. In some embodiments, systems and methods described herein could integrate with machine learning processes using predictive analytics to automate the manual processing of steps 516-524, for example. This integration could occur, for example, through programmatic application interfaces.

Figures 5C, 5D:
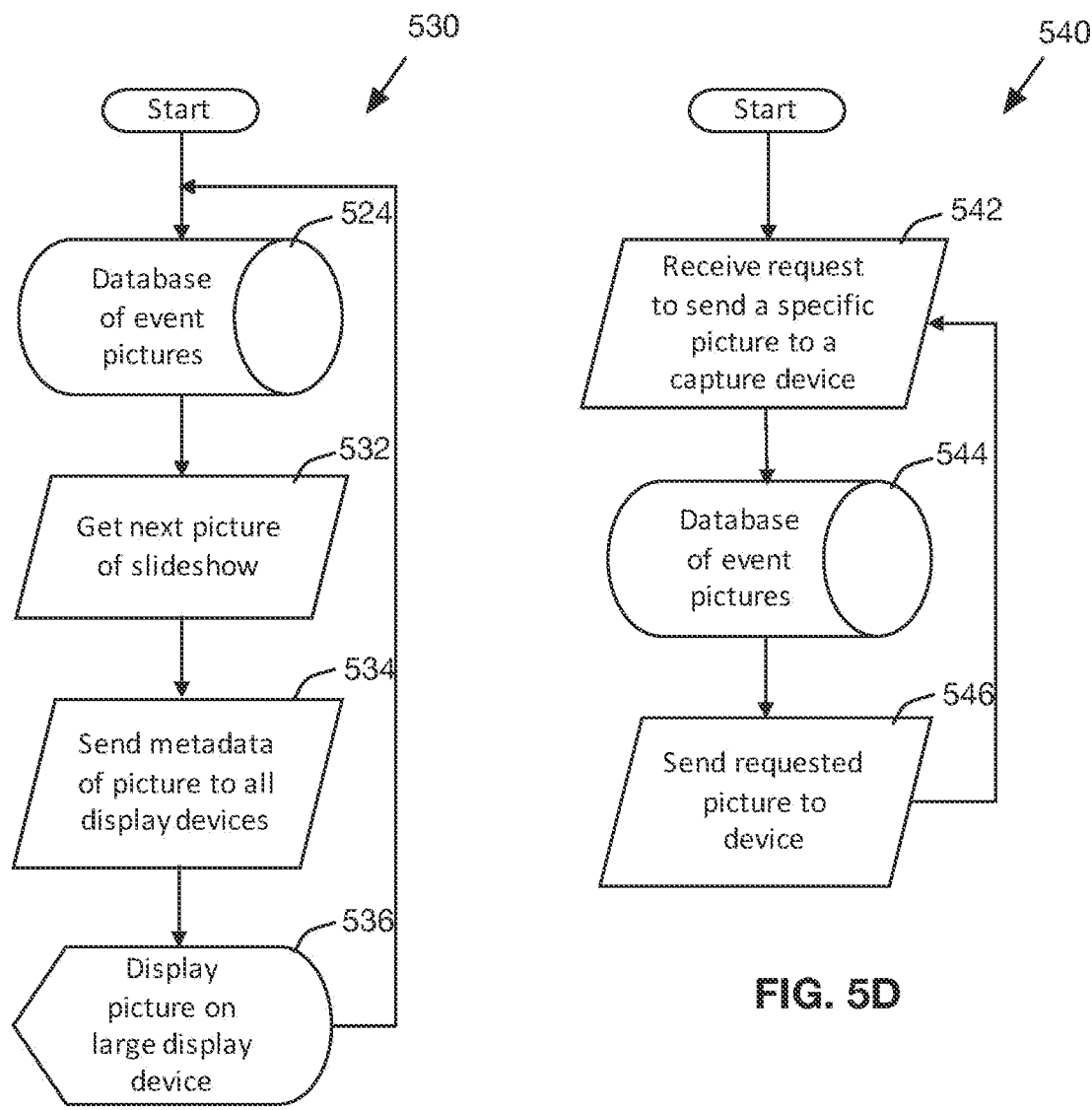
FIG. 5C is a flowchart of the image receival logic that is executed on the gateway server of the example embodiment of FIG. 5A.
FIG. 5D another flowchart depicting capture device request processing logic that may be executed on the gateway server of the example embodiment of FIG. 5A.

An example method 530 of displaying vetted pictures is shown in FIG. 5C. Step 524 may be another background process running on the gateway server 120, responsible for looping through all the published or accepted pictures stored in the local database of event pictures. The process loops through the slideshow of pictures and in step 532 pulls each picture to be displayed. In some embodiments, step 534 may send a notification and the metadata of the picture to be displayed to each display device, which may include one or more remote display agents 140 (e.g., to be shown on the agent 140 screen or display 144), and/or one or more capture devices 130, 132. Step 536 indicates that the gateway server may then presents the slideshow picture to the audience at the event, e.g., through one or more of the display devices.

Method 540 of FIG. 5D illustrates a process for providing a requested picture to a capture device in accordance with an example embodiment. For example, in step 542, another background process running on the gateway server 120 may be responsible for receiving requests sent from capture devices to send the image data to be displayed. The request may be generated as explained in step 306 of FIG. 3A. Steps 544 to 546 pull the requested image from the local database on the gateway server and send the image back to the requesting capture device.

Figure 6:
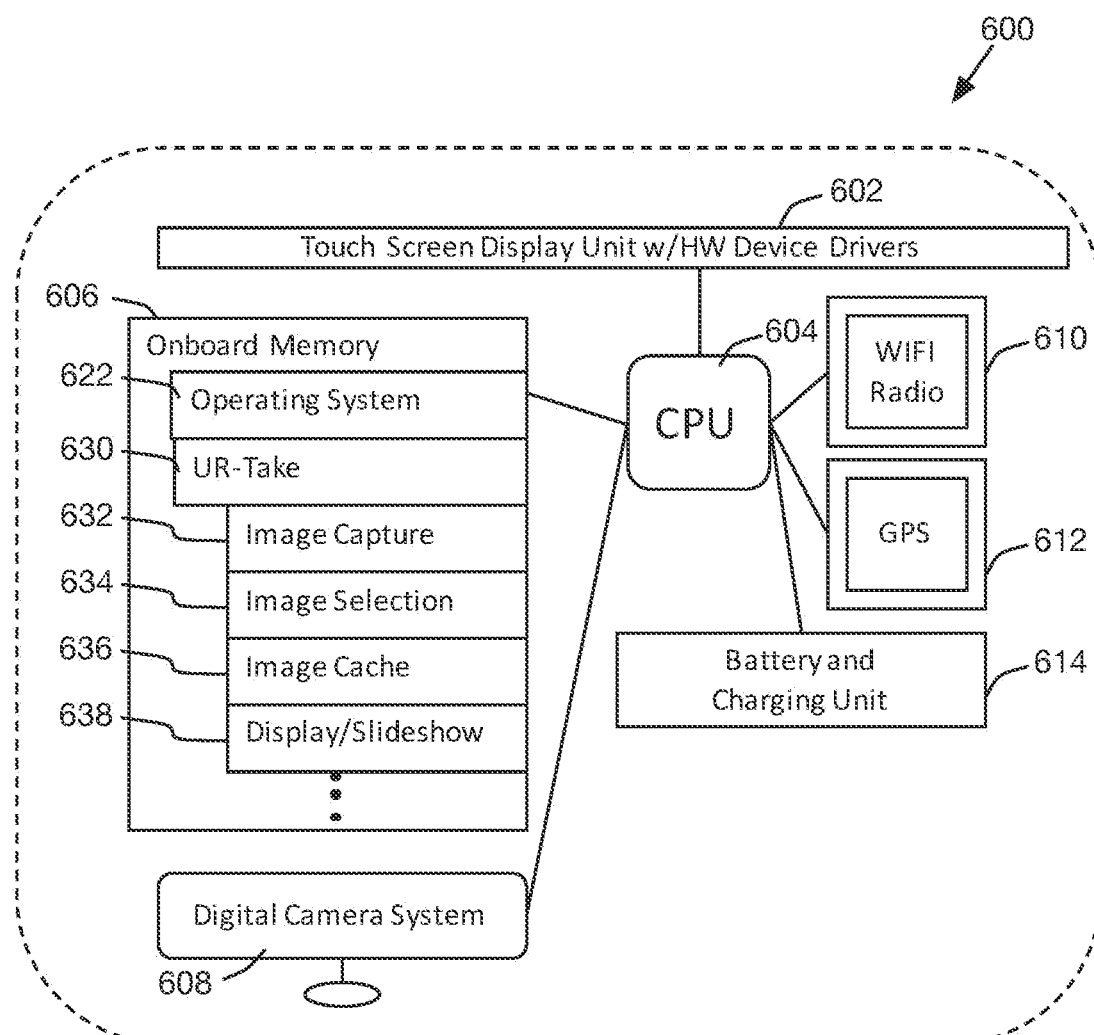
FIG. 6 illustrates the hardware architecture of a capture device in accordance with an example embodiment.

An example capture device 600 is shown in FIG. 6, including a schematic illustration of its hardware architecture in an example embodiment. In some embodiments, device 600 may be used in system 100 as capture devices 130 and/or 132. Device 600 may be a self-contained hardware device capable of executing the steps shown in FIG. 3, FIG. 4A, FIG. 4B. The device 600 may be a fully contained, handheld unit, which may include a touch screen display 602 for input/output functionality. The display 602 may be driven by device drivers and a capture unit CPU 604, which may be configured to execute instructions such as those described above with respect to FIGS. 4A and 4B. Onboard memory 606 may support the CPU for storage and execution of the operating system 622 and processing modules (e.g., UR-Take 630 for performing processes described herein) as well as the storage of images captured by the digital camera system 608. Onboard memory 606 may also be used for the storage of display images and metadata described with respect to FIG. 3. A WIFI radio 610 or other wireless communication interface may provide wireless communication of the device, for example over a local network such as WAN 126 of FIG. 1A or other communication with Gateway server 120 and/or other devices using desired wireless protocols. In some embodiments, a GPS module, or chip 612, may also be incorporated within the capture device to provide location metadata for each picture taken. The GPS module 612 may also be used to track the location of each capture device unit. A Battery 614 and charging mechanism, and/or other power supply, may be used to power the self-contained unit 600.

In some embodiments, a UR-Take application 630 or processing module may include one or more functional modules having instructions or information for desired operations, such as image capture 632 for capturing photographs or other media at an event, image selection 634 for selecting and sharing captured photographs with the gateway server 120 (e.g., to be vetted by hoster and displayed at the event), and image cache 636 for storing captured photographs and/or metadata. In some embodiments, device 600 may include a display/slideshow 638 module for displaying a slideshow or other media sent by the gateway server 120.

As used herein, the term "event" may refer to any setting where one or more capture devices are present to capture images of the event. An event may be a social or recreational occasion such as a wedding, party, vacation, concert, sporting event, etc., where people gather together at the same place and same time and take photos and videos. An event may also be virtual where no physical location is defined for the event and one or more capture devices participate to capture digital images.

In some embodiments, an aspect of the capture device may be its non-requirement for a user to register with the gateway server. At a closed event, for example, capture devices are known by the gateway server before the start of the event. The capture devices may be pre-registered with the gateway server and are the only capture devices allowed to participate in the event. Such an arrangement may greatly simplify use of the system by event attendees, allowing any user to operate a capture device without the need for the user to register at the event or prior to the event. At a secured event, allowing only specified registered capture devices may be critical to preventing data leakage.

Figure 7:
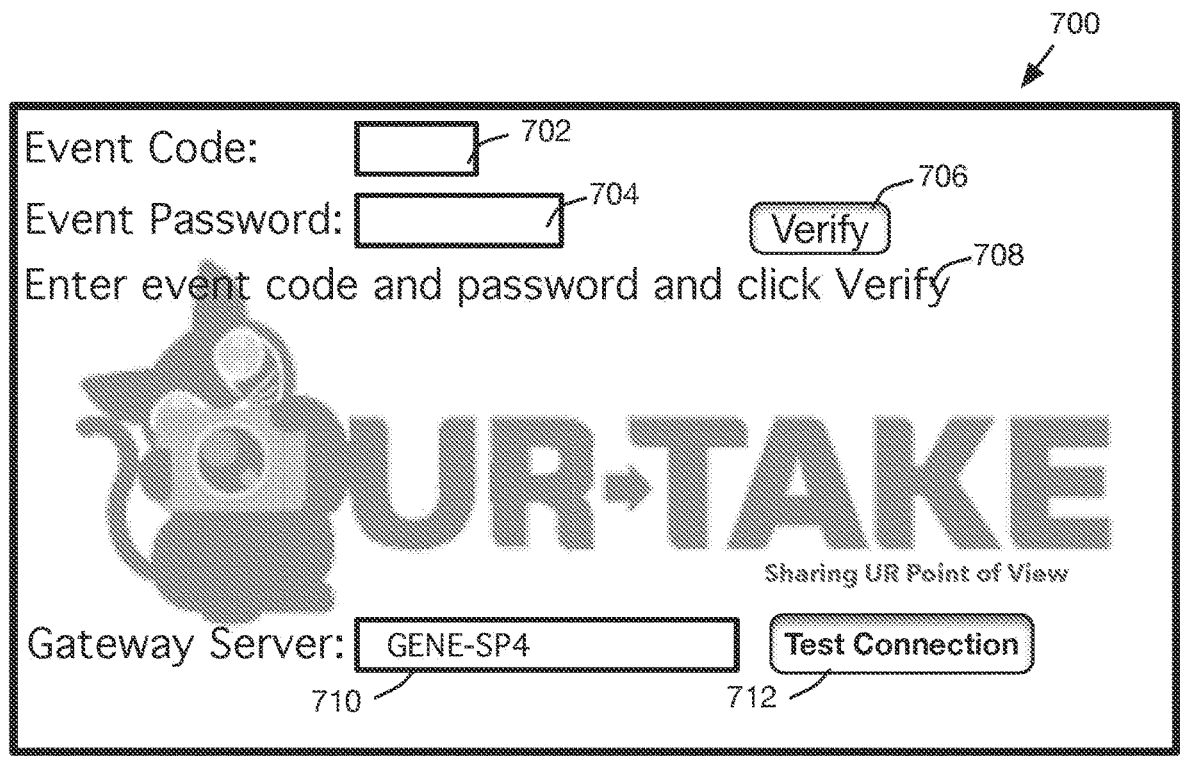
FIG. 7 is a schematic illustration of an example user interface of a capture device depicting an administrator login screen to configure the device for use in accordance with an example embodiment.
Figure 8A:
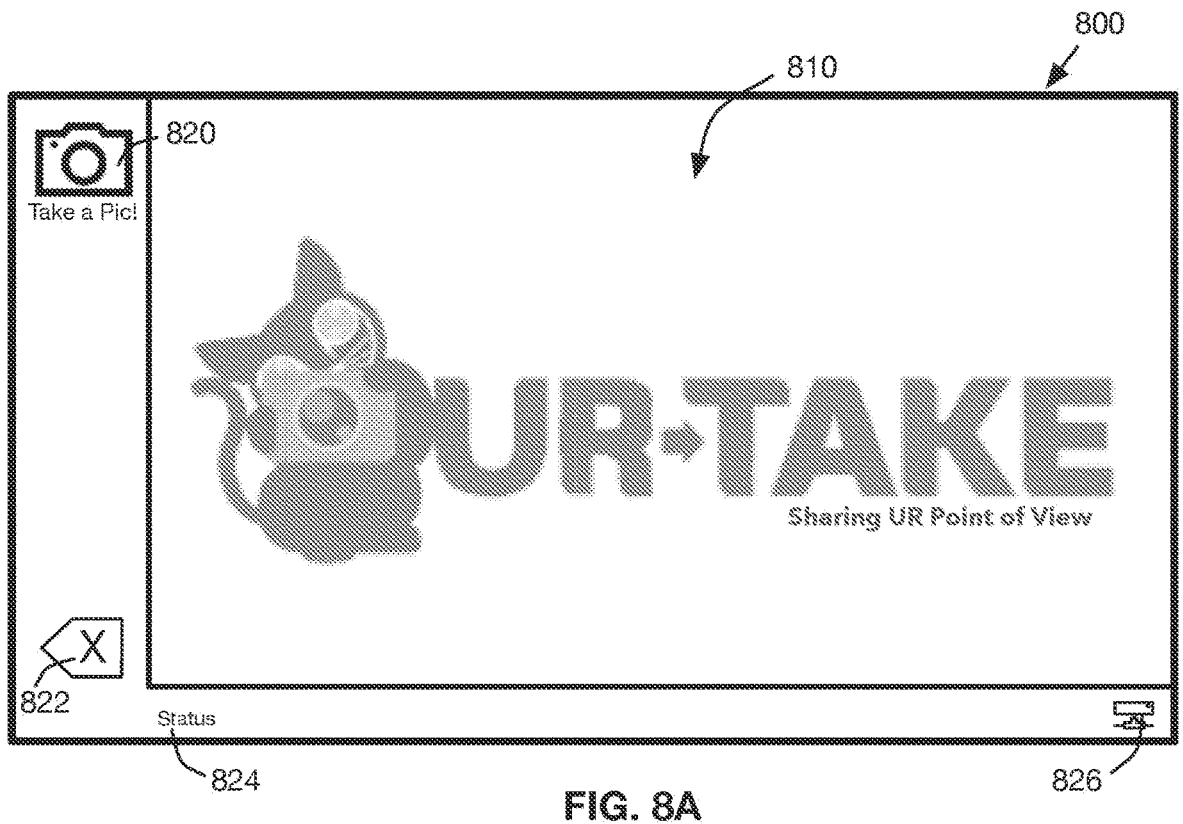
FIG. 8A is a schematic illustration of an example user interface of a capture device depicting a home screen for taking a picture and showing device status.
Figure 8B:
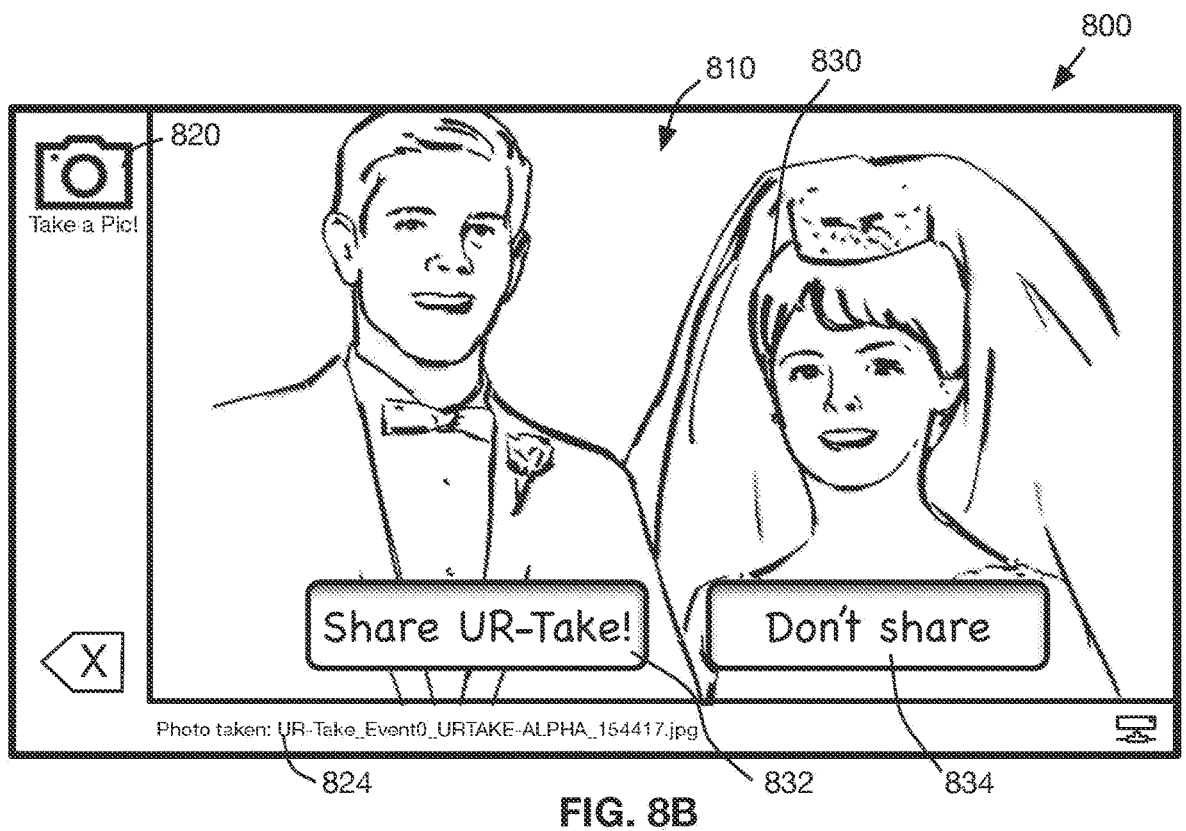
FIG. 8B is a schematic illustration of the example user interface of the capture device of FIG. 8A, showing a picture taken by the user with selectable options for sharing the photo.
Figure 8C:
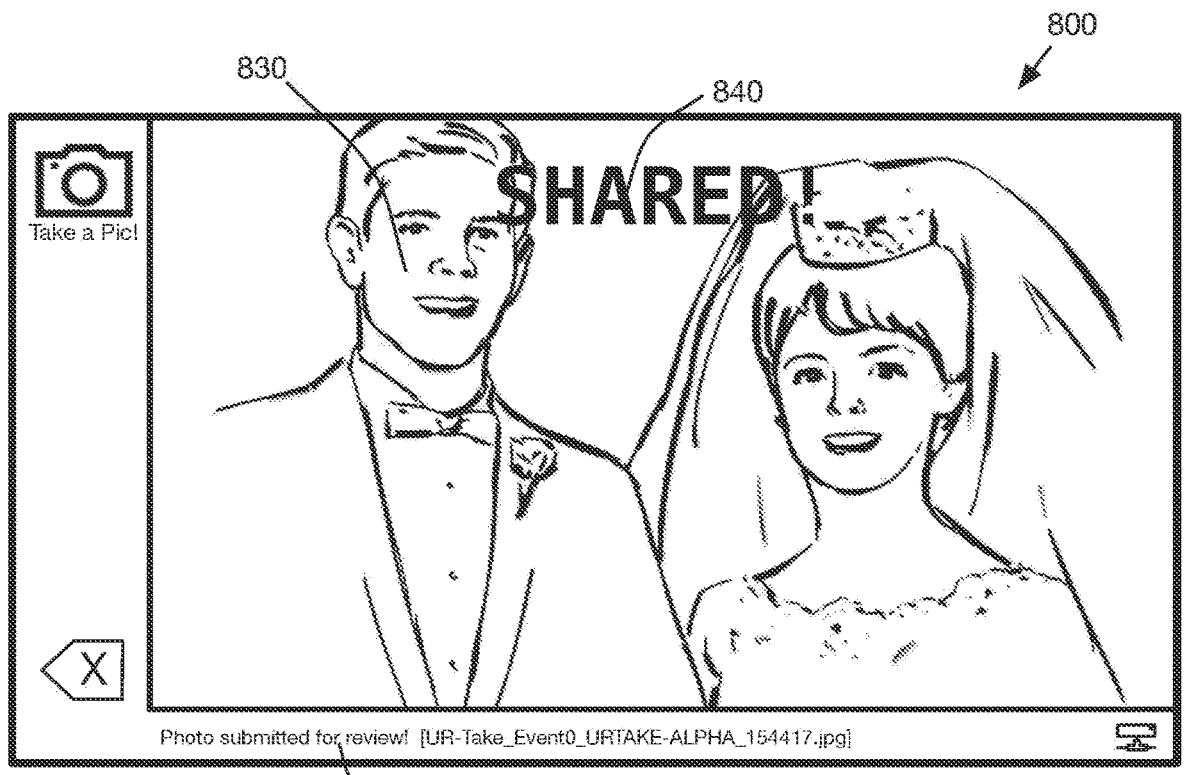
FIG. 8C is a schematic illustration of the example user interface of the capture device and photo of FIG. 8B, indicating that the photo has been shared or submitted back to the hoster.
Figure 8D:
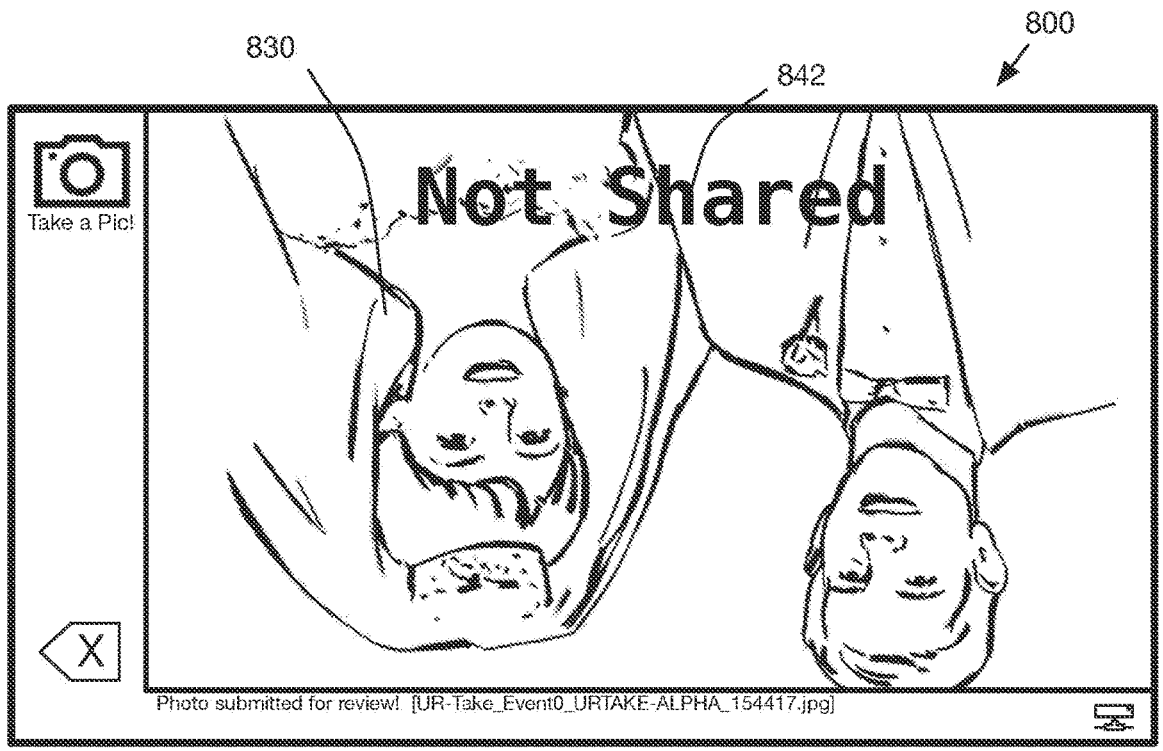
FIG. 8D is another schematic illustration of the example user interface of the capture device and photo of FIG. 8B, in this case indicating that the photo was not shared.
Figure 9:
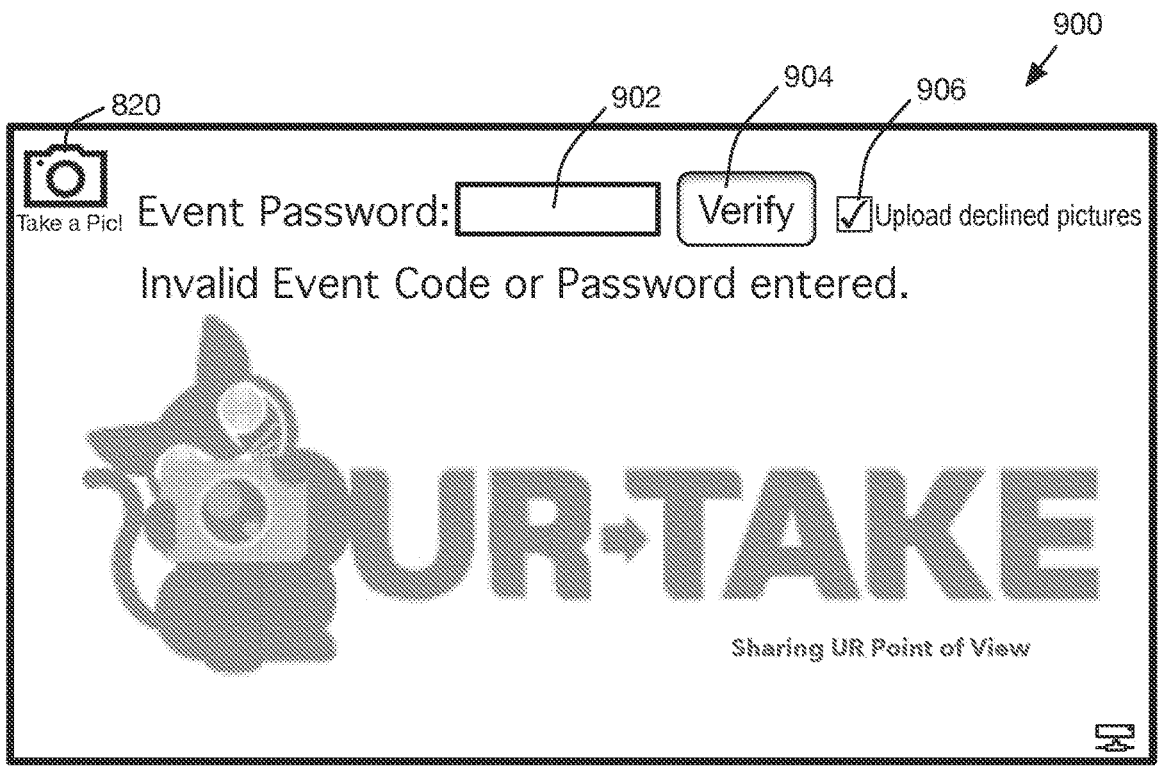
FIG. 9 is a schematic illustration of the example user interface of the capture device of FIG. 7, depicting an administrator log in/out screen in accordance with an example embodiment.

Turning now to FIGS. 7-9, schematic illustrations of example user interfaces of a capture device are shown in accordance with an example embodiment. For example, FIG. 7 is a schematic illustration of a configuration screen 700 that may be used, for example, to pre-register a capture device with the gateway server prior to an event as described above. Such an interface screen 700 may include various fields, buttons, and other features for inputting information and/or configuring the device, for example an Event Code input field 702 and an Event Password field 704 for configuring the device for use at a particular event. A Verify button 706 or other feature may be used to submit information entered in the field 702, 704. Instructions 708 or other information (e.g., regarding status of the device or a request) may also be provided. A Gateway Server field 710 may be used to connect the capture device with a desired server, e.g., gateway server 120 of system 100. A Test Connection button 712 or other feature may be used to submit the entered server information.

FIG. 8A is a schematic illustration of an example image capture screen 800 of a capture device (e.g., device 130, 132, and/or 600). Screen may include a main viewing area 810, e.g., to show a scene or object to be photographed by a user and/or to display pictures or video captured by the device (and/or images or video delivered to the device from the gateway server). Buttons or other selectable features may include Take a Pic 820 and screen navigation 822. Other displayed information or features may include a status bar 824, e.g., for showing the status of the device and/or of an image taken, and/or a connection indicator 824 or other feature to show the network connection status (or in some embodiments power level) of the device.

In FIG. 8B is another view of the example image capture screen or interface 800, showing an image 830 captured with the device 600. Status bar 824 may show a status of the device, such as "Photo taken: [filename]", or other information related to the image, actions taken (or to be taken), and/or the device status. Selection boxes, buttons or other selection features 832, 834 may be employed to allow the user to "share" 832 or "don't share" 834 the image 830.

FIG. 8C shows an example screen 800 following selection by the use of Share UR-Take! 832 in FIG. 8B, showing that the image 830 has been "Shared" 840 with the gateway server. In such embodiments, the shared photo(s) may be viewed, vetted, and or/processed by a hoster or other administrator, e.g., using the local gateway server at the event.

FIG. 8D is an example screenshot illustration informing the user that the image 830 from FIG. 8B has been "Not Shared" 842 (e.g., following selecting the "don't share" button 834 in FIG. 8B). In some embodiments, in response to an election by a user to not share an image, the image may be inverted (as shown in FIG. 8D), greyed out, or otherwise marked to indicate that it has been viewed and selected for not sharing.

FIG. 9 is another schematic illustration of an example user interface of the capture device 800 showing an administrator logout or reset/configuration screen requiring entry of password (and/or an event code, username, and/or other security information) into a field 902. A Verify button or other feature may be used to submit information entered in the field 902. In some embodiments, screen 900 may include an option to elect whether to upload declined pictures (or a subset of the declined pictures cached or otherwise stored in memory), e.g., to the gateway server or other location, before the device is reset or reconfigured.

Figure 10:
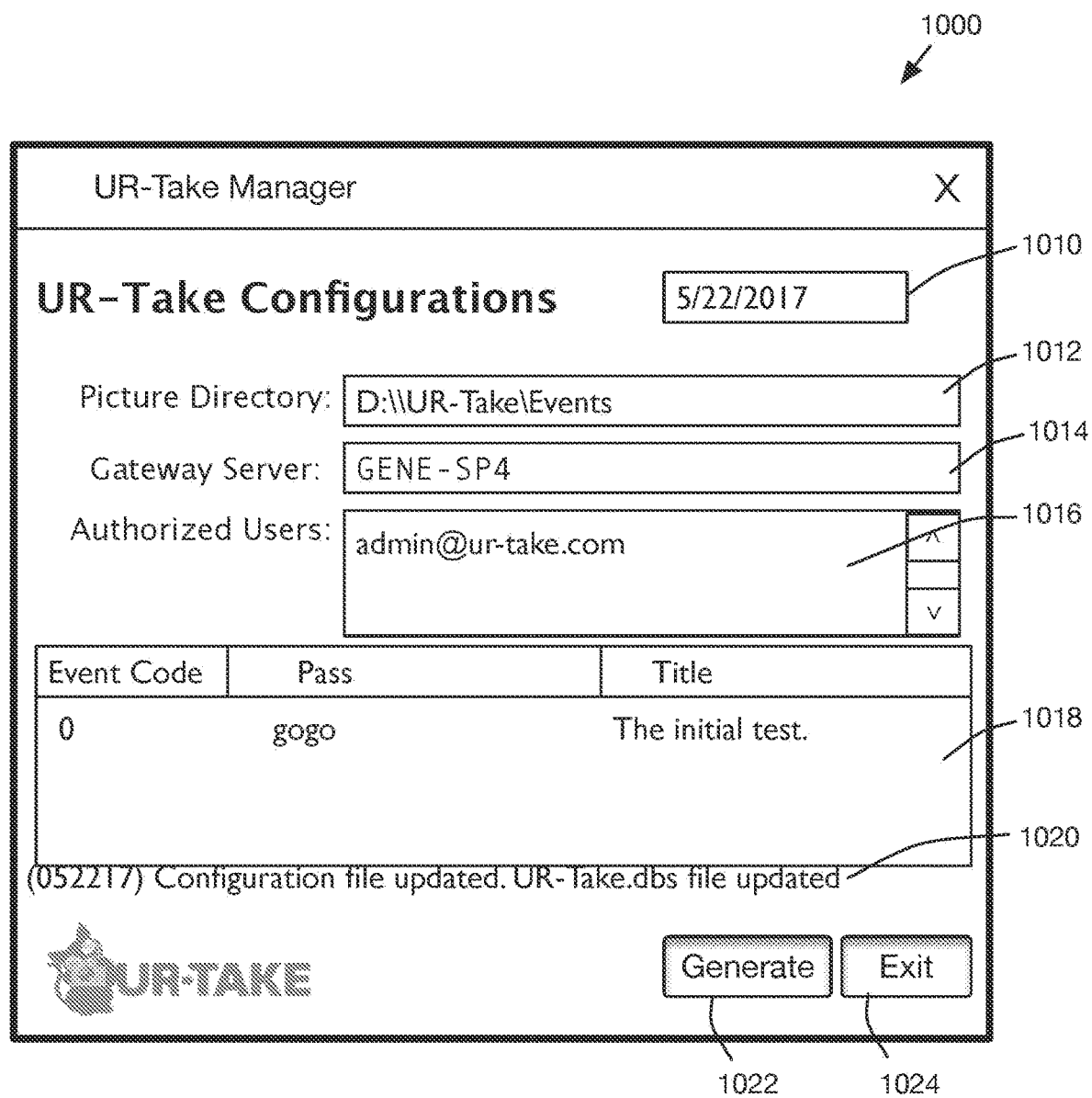
FIG. 10 is a schematic illustration of an example UR-Take Manager screen for configuring the local host system for managing an event, in accordance with an example embodiment.

FIG. 10 is a schematic illustration of an example UR-Take Manager screen 1000 for configuring the gateway server 120 or local event server for managing an event. In this example, UR-Take Manager screen 1000 may be used to input information into the gateway server 120 to communicate with hosted server 162 over the Internet 150. Such communication may be used to configure the gateway server for an upcoming event, e.g., by creating a local database from the hosted server database, downloading processing instructions or other software modules or updates, etc. Communication with the hosted server may also be used to upload images, video, slideshows, or other media or materials from an event to the hosted server and/or other locations via the internet. In some embodiments, a UR-Take Manager screen 1000 may include fields for entering or viewing information such as date 1010, a picture directory 1012, gateway server 1014, authorized users 1016. Other information may include event code process information 1018 and/or a status line for showing the status of a request or activity. Buttons or other user input features may also be used to enter commands, such as Generate 1022 and Exit 1024.

In some embodiments, pre-configuring the gateway server with instructions and data required for communicating with and controlling all capture devices, agents, and display devices during an event allows for a closed, secure network during an event. For example, with reference to FIG. 1A, once configured using information from the hosted server 162 and hosted database 164, gateway server 120 may be disconnected from the internet 150 and communicate during the event only over WAN 126 (or other local wireless protocol) with capture devices 130, 132 and remote display agent(s) 140 and/or using WI-DI (or other local wireless protocol) with display device 124. In other embodiments, gateway server 120 may communicate over the internet, cellular service, or other wired or wireless network during an event.

FIGS. 11A and 11B are schematic illustrations of an example user interface screen 1100 for a media administration system (e.g., UR-Take Gateway 190) of a local event server (e.g., gateway server 120 of FIG. 1A). UR-Take Gateway screen 1100 is configured to provide an event hoster or administrator with the ability to view, vet, configure, and display images or other media during an event. Screen 1100 may include various functional areas or features for displaying and inputting information to the user. For example, a main vetting area 1110 may be configured to display submitted images for approval by the hoster, and may include features for adding captions 1112 or other text, icons, comments, emotes, rankings, etc. as desired to each picture. In some embodiments, a hoster or administrator can approve or reject each picture, e.g., approve by selecting the "Approve" button 1102 and indicating an insertion placement option 1104, e.g., to insert the image as the next slide or at the end. A "Skip" button 1106 may be used to skip a picture for later vetting, and a "Reject" button 1108 may be used to reject a picture such that it is not included in the slideshow or otherwise displayed at the event. In some embodiments, rejecting a picture may delete it from the system. In some embodiments, rejecting a picture may move the picture to a rejected folder, trash folder, or other location. In some embodiments, the system may include an "Auto Approve" feature 1114, for example a box, button, or other feature that may be selected by a user to automatically approve all, or a subset, of pictures submitted to the gateway by the capture devices.

In some embodiments, a user may be able to drag and drop pictures to or from a picture queue 1116, 1118, 1120, 1122, or otherwise selecting or rejecting the picture. In some embodiments, other buttons or other selection or navigation features 1111 (of FIG. 11B) may be used to navigate through the submitted pictures, rotate the pictures, and/or to add transitions such as fades and wipes to the pictures.

In some embodiments, an administrator may incorporate pictures, video, graphics, or other media from other types of devices or sources. For example, a closed, secure gateway server system or other local administrator as described herein may receive photos or other content from the personal cell phone or mobile device of an attendee, or from a source outside the event. For example, media may be dropped into a secure repository, for example by near field communication, or "tap to share" technology, or using an external storage facility such as Dropbox, Google Drive, OneDrive, Box.com, or other cloud storage or sharing service accessible over the Internet or other network. In some embodiments, media may be received by an interactive media presentation system as described herein using one or more other wireless networks and/or communication protocols, such as, for example Bluetooth, MIMS, SMS, AirDrop, WiFi, local area network, cell phone network, or the Internet. In some embodiments, the term "capture device" as used herein may include any hand-held capture device 130, 132, 600 as shown and described above, and/or may include personal cell phones, tablets, or other mobile devices. In some embodiments, the capture devices may include one or more stationary systems, such as a photo booth or other photography or video apparatus or systems.

Other features include a current display area 1130 for showing the picture that is currently being displayed to the event audience, as well as the next 1132 and prior 1134 images. Control features 1136 allow a hoster to start/stop and skip forward and reverse through pictures, to configure delays between pictures 1140; to dynamically cancel a picture so it is not displayed; to rotate, scale or edit pictures; to set transitions between pictures, e.g., wipe, fade in, fade out, dissolve, cuts, etc.; to change view 1138, e.g., to full screen mode; to add audio, captions, emojis, symbols, or other media features; or make other changes to a slideshow or image presentation as desired. A settings menu 1142 may be used to configure additional features or aspects of the system as desired. In some embodiments, a status area 1150 may include status updates, activity log, or other information.

One skilled in the art will appreciate that while many embodiments shown and described herein utilize digital pictures, or photographs, as an example media, the systems and methods herein may be used for capturing, sharing, vetting, editing, and/or displaying any media, including for example photographs, artwork, graphics, presentation materials, video, audio, or any other desired media.

Figure 12:
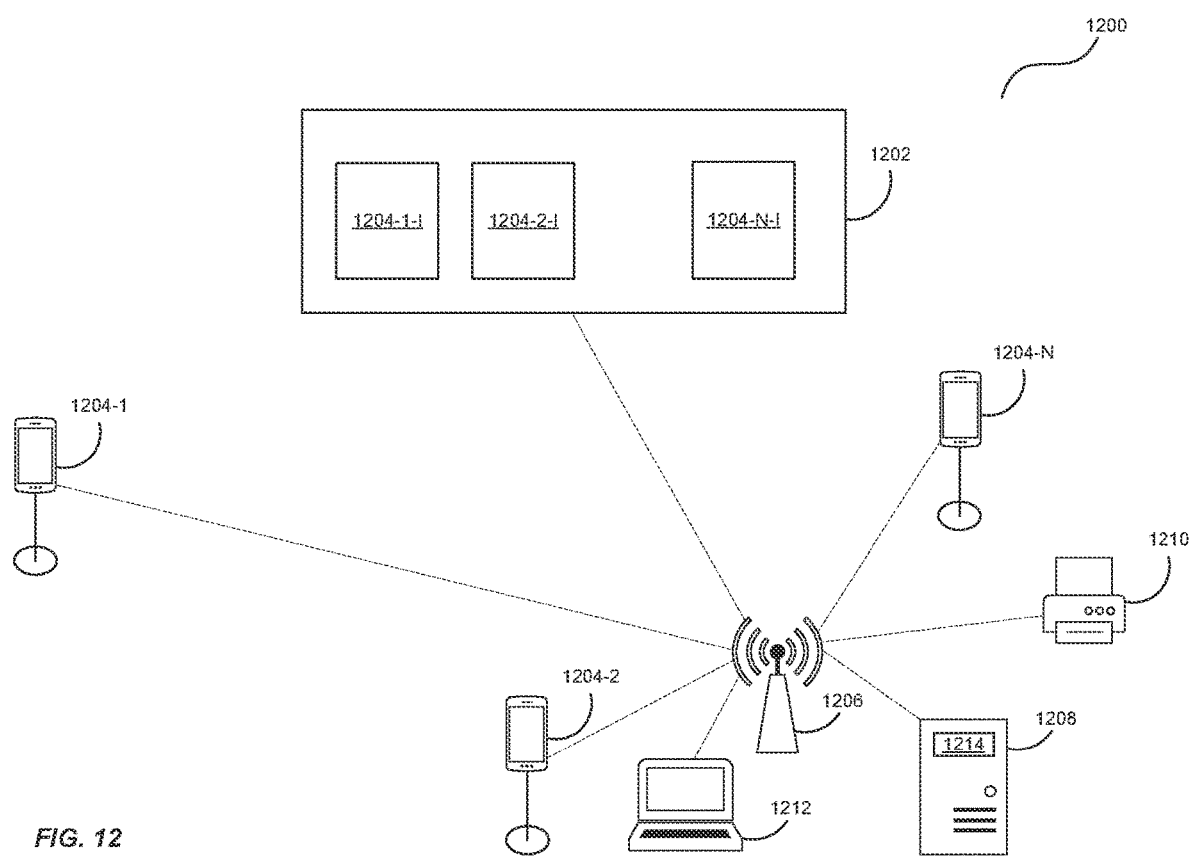
FIG. 12 is a block diagram of another exemplary system for providing a secure media presentation.

FIG. 12 is a block diagram of another system 1200 for capturing, displaying and printing media during an event in one exemplary embodiment. The system 1200 includes a display device 1202, a computing device 1212 (e.g., a laptop computer, a desktop computer, a smart phone etc.), a server 1208, a wireless router 1206, and a plurality of camera devices 1204-1-1204-N (where the reference "N" represents an integer greater than "1" and not necessarily equal to any other "N" reference designated herein). Each of the camera devices 1204 is operable to capture an image (i.e., 1204-1-I-1204-N-I) of a scene at an event. In this regard, the camera devices 1204 may be located within a boundary of the event.

Figure 13:
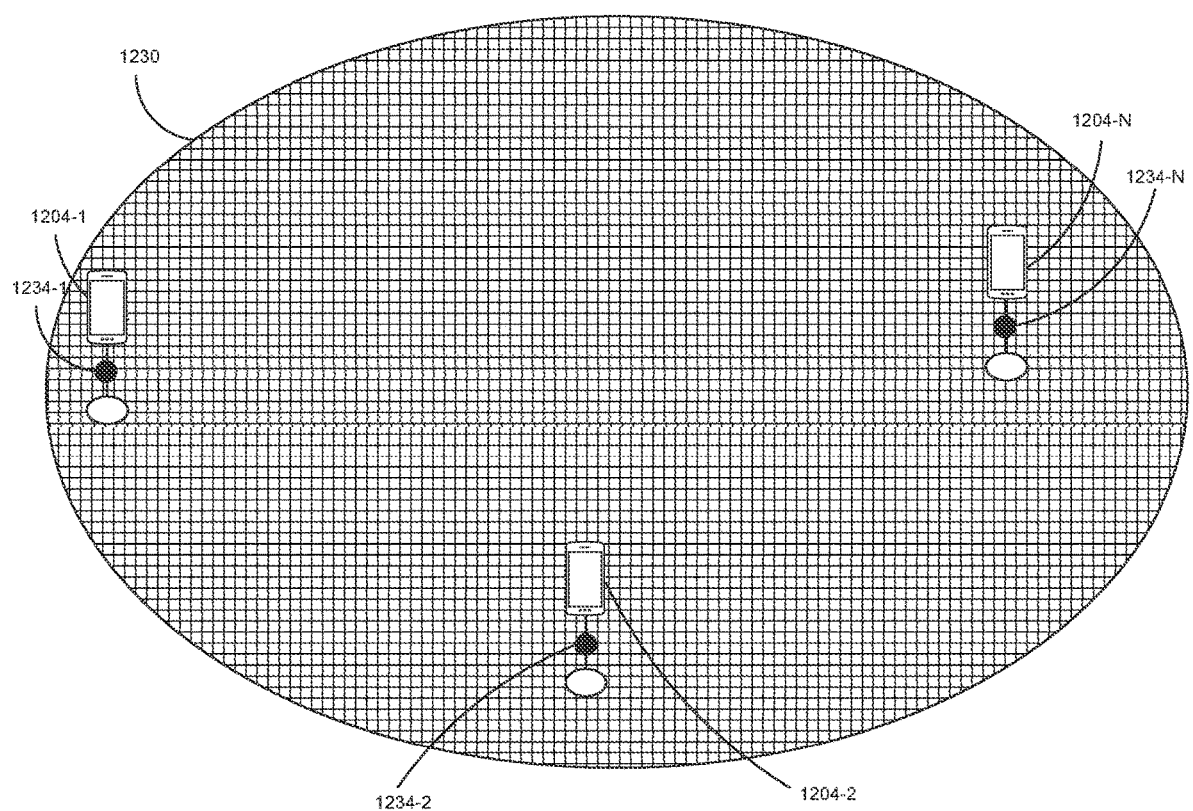
FIG. 13 is a block diagram of an exemplary geo-map employed by the system of FIG. 12

Each of the camera devices 1204 may be configured with a GPS module that is operable to provide a geolocation of the camera device 1204. And, with each of the camera devices 1204 providing its geolocation, the server 1208 may establish a geo-map 1230 of the camera devices 1204, as illustrated in FIG. 13. For example, during an event such as a wedding, an event planner/coordinator may deploy the system 1200 and place the camera devices 1204 at various locations where the event is taking place. Some of the camera devices 1204 may be configured to be stationary whereas other camera devices 1204 may be configured to be mobile and used by attendees of the event. In any case, the camera devices 1204 may report their coordinates 1234-1-1234-N to the server 1208. The server 1208 may then generate the geo-map 1230 and continually monitor the GPS locations of the camera devices 1204. And, when any stationary camera device 1204 moves from its established location, the server 1208 may deactivate the camera device 1204. Similarly, when any mobile camera device 1204 moves outside of the geo-map 1230, the server 1208 may deactivate the camera device 104.

To illustrate, each of the camera devices 1204 may be communicatively coupled to the server 1208 through a secure Wi-Fi connection provided by the wireless router 1206. This secure Wi-Fi connection establishes a local area network (LAN) that allows each of the camera devices 1204 to securely convey traffic, including images and the geo-locations of the camera devices 1204, to the server 1208. In this regard, the wireless router 1206 may employ Wi-Fi Protected Access Version 2 (WPA2) as a secure wireless protocol with Advanced Encryption Standard (AES) encryption or higher to prevent intrusion and/or access by devices and systems external to the LAN, And, the wireless router 1206 may dynamically assign internet protocol addresses to various devices in the system 1200, such as the camera devices 1208.

The camera devices 1208 may transfer status updates in the form of metadata either separate from or included with the image data. For example, this metadata may be periodically transferred to the server 1208 and/or be associated with image transfers to the server 1208. Thus, when the server 1208 receives metadata indicating that a camera device 1204 is outside of the geo-map 1230, the server 1204 may transfer a disable signal over the Wi-Fi connection to the camera device 1204 that directs the camera device 1204 to become inoperable without the proper authentication by the user. Alternatively or additionally, the disable signal may direct the camera device 1204 to encrypt any data retained with the camera device 1204 including any images that were taken by the camera device 1204. Generally, the images of a camera device 1204 are encrypted in any case and are only available upon decryption by the event coordinator (e.g., via a decryption key of the decryption modules associated with the encryption modules used to encrypt the images).

In some embodiments, the camera devices 1204 may be communicatively coupled to one another as a backup connection. For example, as a backup security feature, each of the camera devices 1204 within the system 1200 may communicate metadata to each other (e.g., via Wi-Fi and/or Bluetooth functionality). Thus, if one of the camera devices 1204 moves outside of the geo-map 1230, another of the camera devices 1204 could direct the server 1208 to disable the camera device 1204 outside of the geo-map 1230. In some embodiments, the geo-map 1230 itself is used to disable a camera device 1204. For example, when the system 1200 is deployed, each of the camera devices 1204 (i.e., at least the stationary camera devices 1204) may report their geo-locations to the server 1208. Based on these geo-locations, the server 1208 may compute the geo-map 1230 so as to establish a boundary for the system 1200. Then, the server 1208 may transfer the geo-map 1230 to each of the camera devices 1204 such that the camera devices 1204 can monitor its movement and/or the movement of another camera device 1204. In this "self-aware" embodiment, each camera device 1204 can direct its disablement when it moves outside of the boundary of the geo-map 1230. Generally, since connections are continuously maintained between the camera devices 1204 and the server 1208, the GPS locations of the camera devices 1204 are present in the metadata of the connection information and any changes to camera device locations may be broadcast over the secure connection of the wireless router 1206.

Figure 14:
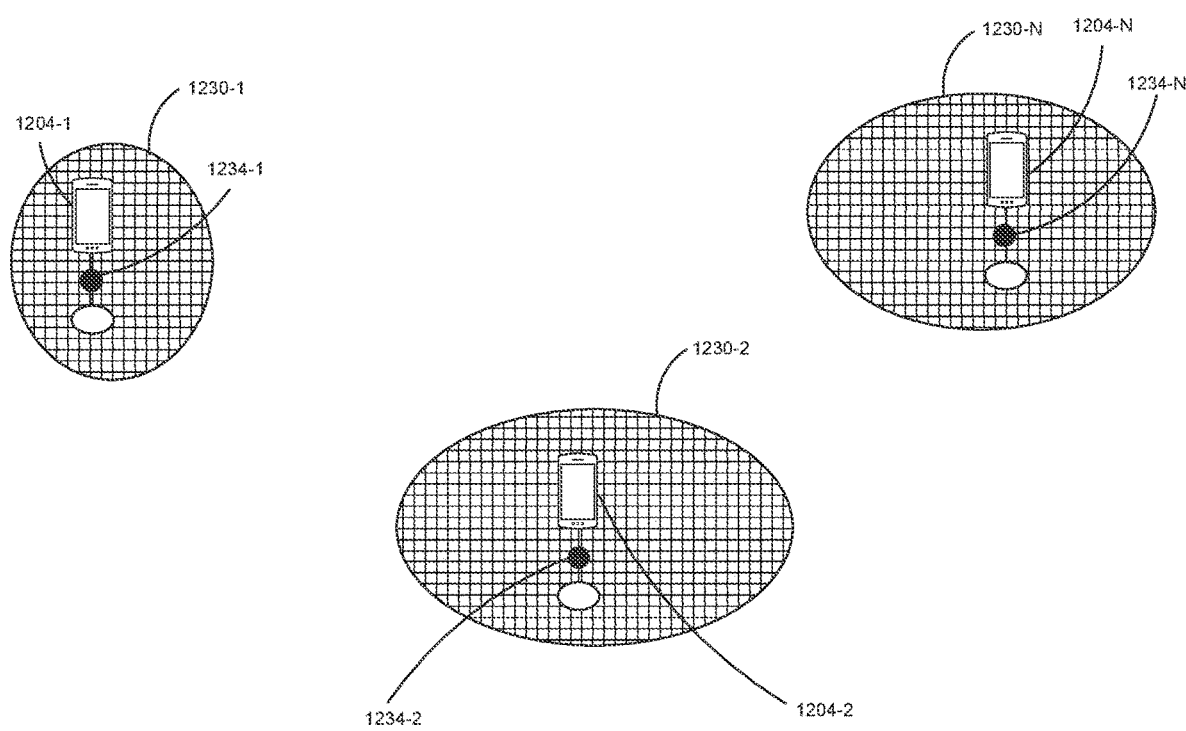
FIG. 14 is a block diagram of a plurality of exemplary geo-maps employed by the system of FIG. 12.

In some embodiments, the geo-map 1230 may be implemented as a plurality of discrete geo-maps 1230-1-1230-N. For example, the event may be one in which groups of people gather online at different locations (e.g., across the country, the globe, etc.). And, each location may be configured with one or more camera devices 1204, as illustrated in FIG. 14. In such an embodiment, the server 1208 may communicate with each of the camera devices 1204 over the Internet via a secure link, such as those employed by various Internet proxies. The camera devices 1204 may then report their geo-locations to server 1208 through the secure link such that the server 1208 can generate a plurality of geo-maps 1230 for the camera devices 1204.

To illustrate, the camera device 1204-1 may report its coordinate 1234-1 to the server 1208. The server 1208 may then generate the geo-map 1230-1 about that coordinate 1234-1 and transfer that geo-map 1230-1 to the camera device 1204-1. The camera devices 1204-2-1204-N may operate in a similar fashion such that the server 1208 can generate geo-maps 1230-2-1230-N for those camera devices 1204 as well. Then, when any of the camera devices 1204 moves outside of their respective geo-maps 1230, the camera devices 1204 may be disabled as described above.

In such an embodiment, guests of the event may be sent invitations to their personal devices (e.g., computers, tablet computing devices, smart phones, etc.). The invitations may include a link that allows the personal devices to communicate to the server 1208 in a manner similar to the camera devices 1204 (e.g., a secure tunnel of an Internet proxy). And, as the camera devices 1204 at each particular location are capturing images in the vicinity of their respective geo-maps 1230, those images may be transferred to server 1208 such that they may be vetted by a user of the computing device 1212. The vetted images may then be transferred to the personal devices for viewing.

In some embodiments, the personal devices may be configured to operate in a manner similar to the camera devices 1204 of the system 1200. However, the invitation may control the camera to ensure that images of the event are not available to the camera storage of the personal devices. For example, the invitation made include a software module that takes control of the personal device such that images taken by the personal device are automatically transferred to the server 1208 (e.g., in an encrypted fashion, such as with a secure socket layer, or "SSL") without being retained/stored on the personal device. This embodiment may provide some additional security to the event as only attendees who have RSVP'd via the invitation may attend the event.

In some embodiments, the camera devices 1204 is operable to detect certain features of event attendees. For example, the camera devices 1204 may include feature/facial recognition software. In this regard, the camera device 1204 may be operable to detect when a person is within view of the camera device 1204 and automatically capture an image of the person and/or capture an image of the person after some countdown period. Then, the camera device 1204 may display the captured image such that the person may approve of the captured image before it is transferred to the server 1208. Such approval may be in the form of a "thumbs up" by the person that directs the camera device 1204 to transfer the captured image to the server 1208. And, a "thumbs down" by the person may direct the camera device 1204 to delete the captured image. In some embodiments, the camera device 1204 may present the person with the opportunity to print the captured image via the printer 1210. Thus, a thumbs up by the person may direct the camera to transfer the captured image to the server 1208 for printing on the printer 1210. And, a thumbs down by the person may prevent the image from being printed. This type of an approval or rejection allows for a "hands-free" operation of the camera.

In some embodiments, inter-process communications take place on the server 1208 via sockets and/or named "pipes". For example, the server 1208 may dedicate a background process that listens to a specific named pipe between the server 1208 and a computing device 1204. The background process may then process operation codes ("opcodes") that it receives from the camera device 1204 through the named pipe. The server 1208 can also receive messages from internal processes running on the server 1208, external processes running on accessory applications (e.g., on the same machine as the server 1208 or on a dedicated system), and/or external processes running on the camera devices 1204.

Messages being passed between the various components of the system 1200 may comprise the following format:

| opcode | message buffer |
| --- | --- |

The opcode may designate the operation to perform or the type of message that is being sent. For example, the opcode can have values such as: "ping"—a heartbeat message sent from each of the camera devices 1204 to the server 1208 (e.g., as part of the external processes running on the camera devices 1204); "new"—an indicator that notifies the server 1208 that new picture files exist (e.g., as part of the internal processes running on the server 1208); "ra"—an indicator that notifies the server 1208 that a remote approving application is available (e.g., as part of the external processes running on accessory applications); and "exit"—an indicator that notifies the server 1208 to shutdown (e.g., as part of the internal processes running on the server 1208).

One example of how messages may be parsed and used can be seen with the ping heartbeat message. For example, when a camera device 1204 sends a ping message to the server 1208, one message to indicate the power remaining in the camera device may have the following format:

| ping | deviceName > yyyy-mm-dd hh:mm:ss > camera tag > powerRemaining% |
| --- | --- |

The data fields may be delimited using the greater than (">") sign and contain the following information: deviceName—the hardware name of the camera device 1204; date-time stamp—the time in which the ping was issued from the camera device 1204; camera tag—a short name/alias used for the camera device 1204; and powerRemaining%—the percentage of battery life left in the camera device 1204's battery.

Some messages may be sent directly from one process to the server 1208, as in the case of the "new" message. For example, the "new" message may be sent from a background process running within the server 1208. That message may include a specific file directory for any new picture file that is being created in the "watched" directory. In this example, when the watcher process identifies a newly created picture file, the watcher process may send the "new" message to the server 1208 directly through a named pipe designating the server 1208 to capture all the new pictures that have been deposited in the "watched" directory.

A message such as the "ping" operation may originate from the camera device 1204. This message may take a more indirect route to the server 1208. The purpose for this indirect route is to allow for scalability and performance. For example, utilizing a more robust platform for inter-process communication (e.g., RESTful web services and a web server), performance can be maintained even as the number of camera devices 1204 used at an event can be scaled from 5 to 100 or more and the number of incoming messages multiplies, leaving the server 1208 able to process other communications. In some embodiments, this messaging is used to reduce traffic within the system 1200. For example, instead of passing images from device to device, the messaging may allow for indications of images such that the actual images can be retrieved from a particular device when deemed necessary (e.g., after processing an associated message).

Figure 15:
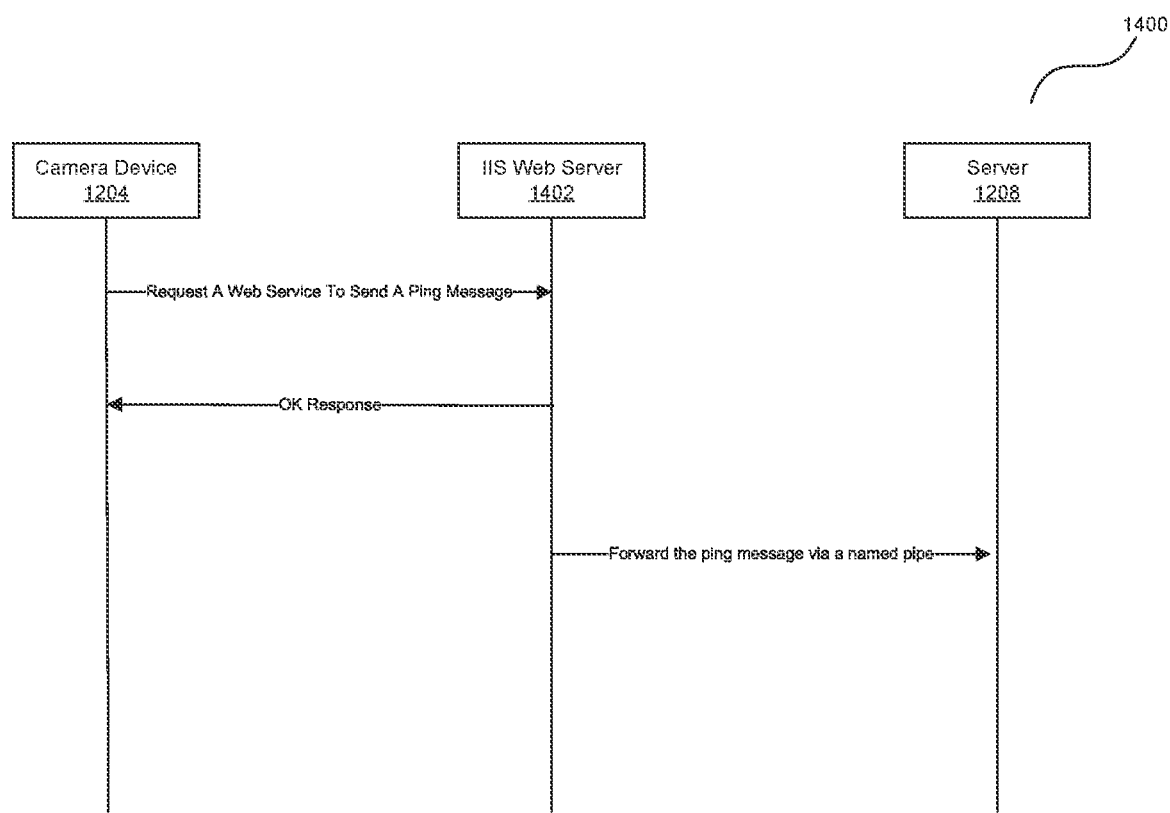
FIGS. 15-17 are exemplary message diagrams employed by the system of FIG. 12.

To illustrate, FIG. 15 illustrates one exemplary message flow diagram 1400 of a ping message. For the "ping" message to travel to the server 1208, the camera devices 1204 are the initial devices sending the ping/heartbeat messages. An Internet Information Services (IIS) web server 1402 (e.g., a Microsoft Web Server) may be running on the server 1208 or another device. For example, during startup of the system 1200, each of the devices in the system 1200 will contact the IIS web server 1402 and establish links between the devices and the server. In this regard, a camera device 1204 may issue a request to the IIS Web server 1402 to send a ping message. If the connection is approved, the IIS Web server 1402 responds with an "OK" response. Then, the IIS Web server 1402 forwards the ping message to the server 1208 via a named pipe that allows the server 1208 to know which camera device 1204 is making the ping.

This architecture may allow an existing platform, such as the IIS web server 1402, to handle a high volume of messages and connections from external devices, and to manage all connections and communications to the server 1208. It then forwards appropriate messages, such as the "ping" message, directly to the server 1208 via the named pipe. One advantage to this architecture is that the local web server (e.g., the IIS web server 1402) is already running on the same machine as the server 1208 and is therefore transferring messages from a single process over a named pipe to the server 1208, which may be much more performant especially as the number of external devices scales up.

Figure 16:
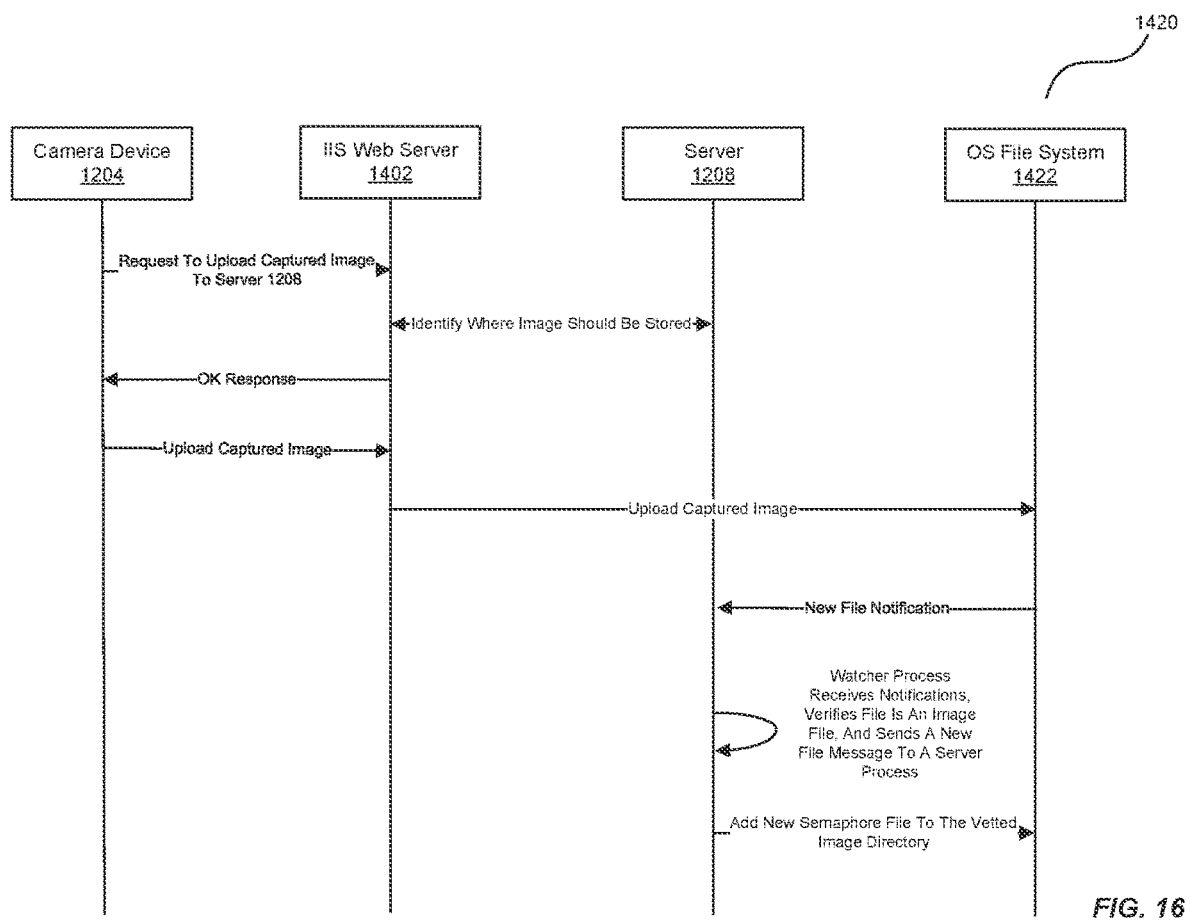

Other operations/messages may be handled by the web services running on the web server. These operations may include, for example, uploading a picture file from a camera device 1204 to the server 1208, downloading a picture file from the server 1208 to the camera device 1204, downloading global camera settings from the server 1208, and sending a "print" picture request to the printer 1210 (e.g., via the server 1208). For example, FIG. 16 illustrates a message diagram 1420 for a picture file being uploaded from the camera device 1204 to the server 1208.

In this embodiment, the camera device 1204 contacts the IIS Web server 1402 to request to upload a captured image to the server 1208. The IIS Web server 1402 may then identify where the image should be stored on the server 1208. Once identified, the IIS Web server 1402 may respond with an "OK" response and the camera device 1204 may in turn upload the captured image to the IIS web server 1402. The IIS Web server 1402 writes/creates the captured image file to the identified storage location in the operating system (OS) file system 1422 of the server 1208. The OS file system 1422 of the server 1208 may then issue a new file notification to the server 1208. These notifications may be sent when files are created and/or deleted and allow the server 1208 to take appropriate actions on newly created files.

A watcher process of the server 1208 may receive the notifications, verify that the file is an image file, and send the new file to a server process. The watcher process of the server 1208 may then add the names of the new image files to its internal list of managed imaged files by creating semaphore files in a vetted image directory, as shown and described in FIG. 17. The process of saving a picture file is robust and dependable under this process. For example, the OS file system 1422 is fairly resilient and can handle a high volume of file creations. And, the notifications from the OS file system 1422 are reliable and in real-time to allow the server 1208 to gather notifications and process them as a batch as opposed to each one individually. This has proven to be a very scalable solution for managing image creations of one hundred different cameras or more simultaneously. Similarly, hundreds of picture files may be copied directly into the "watched" directory from another local directory (e.g., hundreds of images being transferred in milliseconds) are easily managed by the server 1208 because of this batch file approach.

The OS file system 1422 can also be utilized to send messages to other processes via metadata of an image file. In some embodiments, the OS file system 1422 may act as a semaphore to the system 1200 that creates file signals or flags for an action that should be taken. And, depending on where a file is created, the OS file system 1402 may trigger a different action for the server 1208 so as to provide a robust, performant, and extendible system 1200.

Figure 17:
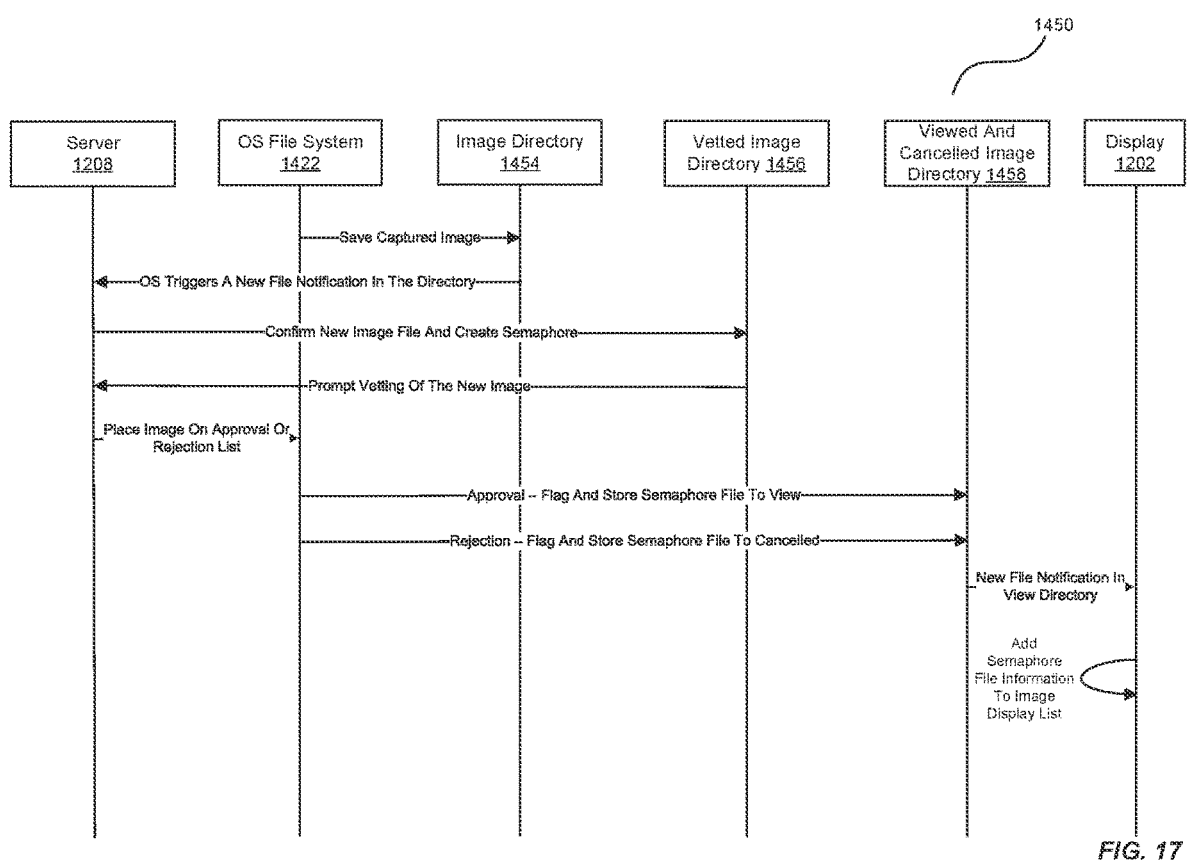

FIG. 17 shows another exemplary message diagram 1450 operable within the system 1200. In this embodiment, the message diagram 1450 illustrates the vetting process when an image is received by the server 1208. First, the OS file system 1422 saves the captured image in an image directory 1454. The image directory 1454 then triggers the OS of the server 1208 to issue a new file notification in the image directory 1454. The server 1208 responds by confirming a new image file in the image directory and creates a semaphore file (not the image or a copy of the image file) in a vetted image directory 1456 (i.e., a directory where names of images that are to be vetted reside on the computing device 1212). This prompts the server 1208 to direct the computing device 1212 to initiate vetting of the new image. Once vetted by the computing device 1212, the server 1208 places the semaphore file of the vetted image in an approval directory or in a rejection directory 1458 (e.g., two separate directories). For example, the server 1208 may direct the OS file system 1402 to save the semaphore file of a vetted and approved image in a directory called "view". Conversely, a rejection may result in the OS file system 1402 moving the semaphore file to a "canceled" directory. For "view" files, the directory 1458 may notify the display 1202 that a new image is ready for display. In this regard, the display 1202 may receive the image from the directory 1458. The display 1202 may add the semaphore file information to the image display list such that the image may be added to the slideshow being presented on the display 1202. For the cancelled directory, the names or other identifying features of images, such as image locations, may be stored such that images can be retrieved afterwards if desired.

Figure 18:
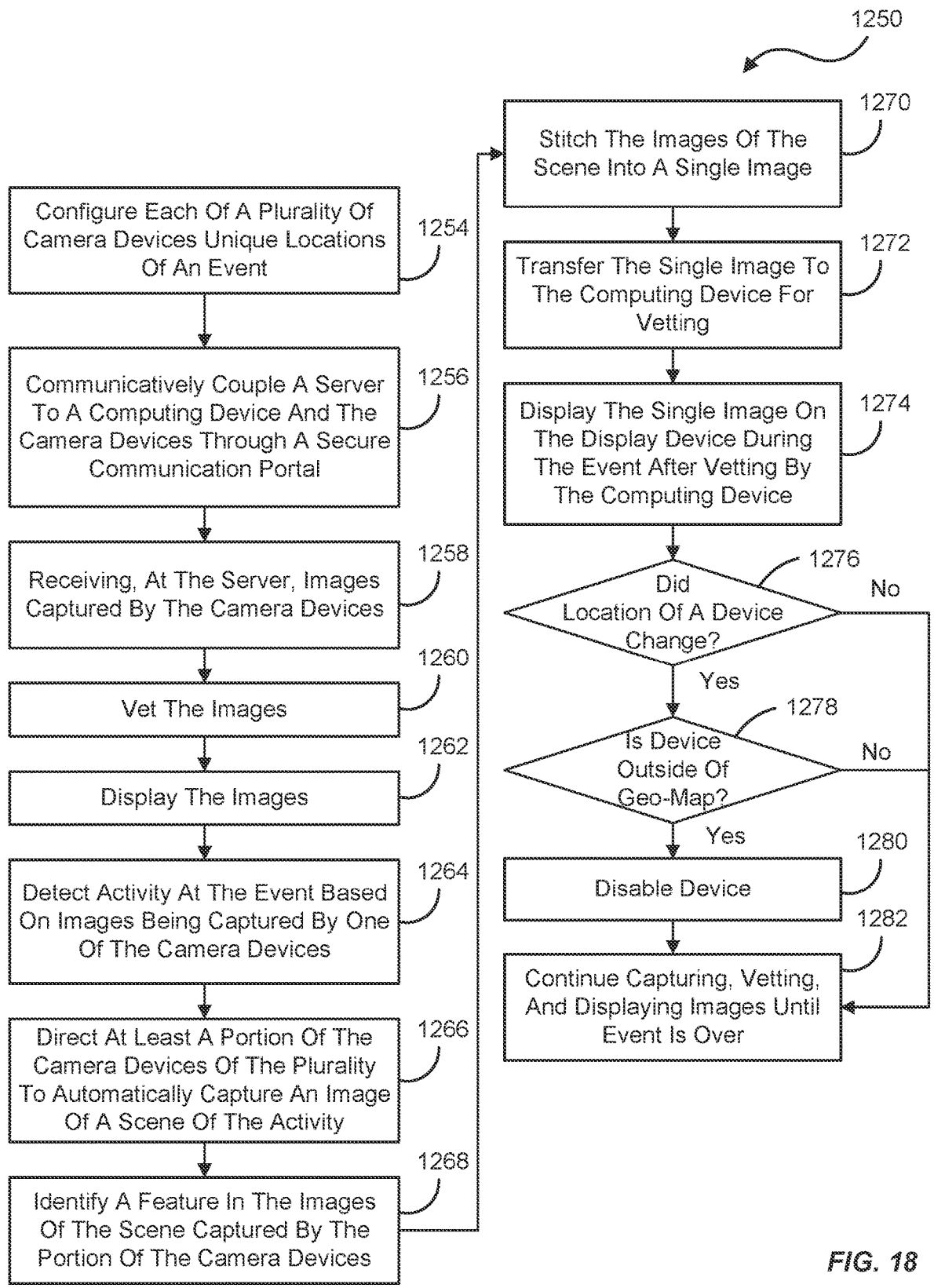
FIG. 18 is a flowchart of an exemplary process of the system of FIG. 12.

FIG. 18 is a flowchart of an exemplary process 1250 that maybe implemented by the system 1200 of FIG. 1. In this embodiment, the process 1250 initiates when a plurality of camera devices 1204 are established at unique locations of an event, in the process element 1254, and the server 1208 is communicatively coupled to the computing device 1212 and the camera devices 1204-1-1204-N through a secure communication portal, in the process element 1256. For example, the camera devices 1204 and the computing device 1212 may be communicatively coupled to the server 1208 via the wireless router 1206. Alternatively or additionally, the camera devices 1204 and/or the computing device 1212 may be communicatively coupled to the server through other data connections (e.g., Bluetooth, cellular data connections, etc.).

In the process element 1258, the server 1208 receives the images captured by the camera devices 1204. The server 1208 may then transfer the images to the computing device 1212 such that a user of the computing device 1212 can vet the images, in the process element 1260. In some embodiments, this and other image transfers within the system 1200 may include lower resolutions images to reduce the amount of data being transferred within the system 1200. Once the images are vetted, the computing device 1212 and/or the server 1208 may display the images on the display device 1202 (e.g., a television, a projector screen, personal computing devices, etc.), in the process element 1262.

In some embodiments, the system 1200 may detect an activity at the event based on images being captured by one or more of the camera devices, in the process element 1264. For example, one of the camera devices 1204 may be capturing images at a faster frequency than other camera devices 1204 at the event. The camera device 1204 may send messages and/or metadata pertaining to the images being captured such that various devices in the system 1200 can determine that the camera device 1204 is capturing images at a faster frequency. The server 1208 and/or the remaining interconnected camera devices 1204 may detect this activity and then direct at least a portion of the camera devices 1204 to automatically capture an image of a scene of the activity, in the process element 1266. To illustrate, upon detecting a particular camera device capturing images at a faster frequency than other camera devices 1204 at the event, the server 1208 may determine an activity taking place and identify other camera devices 1204 near the activity based on the geo-map 1230. Then, the server 1208 may direct those camera device 1204 in the vicinity of the activity (i.e., based on the geo-map 1230) to capture images of the activity. The server may do this for any or all of the camera device 1204 at the event and stitch all or a portion of the images together into one or more images.

After the images are transferred to the server 1208 for vetting by the computing device 1212, the server 1208 may automatically identify a feature in at least two of the images of the scene, in the process element 1268, such that the server 1208 may automatically stitch the images of the scene into a single image, in the process element 1270. For example, the server 1208 may be configured with a software module 1214 that is operable to implement a machine learning module that processes the images to identify certain features. Then, other components of the software module 1214 and/or the machine learning module may automatically stitch the images together by adjusting the images according to scale, parallax, contrast, lighting, and the like. An example of such is shown and described below in FIG. 20. Alternatively or additionally, the computing device 1212 may be configured with an image editing software module that is operable to identify features in the images in the scene and stitch the images into a single image. In some embodiments, the camera devices 1204 may send its coordinates to the software module to assist the software module 1214 in compensating for parallax and other visual features.

Once the multiple images have been stitched together into a single image, the server 1208 may transfer the single/stitched image to the computing device 1212 for vetting, in the process element 1272. And after the image is vetted, the computing device 1212 may direct the server 1208 to display the image on the display device 1202, in the process element 1274.

In some embodiments, the server 1208 may be operable to generate a panorama of pictures by utilizing the camera device 1204 using the geo-map 1230. For example, as the geo-locations of each of the camera devices 1204 may be known from the geo-map 1230, the server 1208 may be operable to provide scaling factors to the images captured by the camera devices 1204. And, the server 1208 may direct each of the camera devices 1204 to capture an image as essentially the same time such that the images may be stitched together in a panoramic view. The server 1208 may also determine which of the camera devices 1204 are to capture the images for the panoramic view. For example, the server 1208 may direct only a portion of the camera devices 1204 to capture images that are within view of a particular scene at the event. In some embodiments, the server 1208 may be operable to direct all of the camera devices 1204 at the event to capture an image at the same time such that all of the activity occurring in the event at a particular moment in time can be captured. In some embodiments, the camera devices 1204 may allow the attendees to opt out of a particular capture. For example, the camera devices 1204 may display a message to the attendees that a panoramic capture or a whole event capture is about to occur. The camera devices 1204 may then initiate a countdown and display a "opt out" selection on a user interface of the camera devices 1204 that allows the users to opt out of the image being captured In some embodiments, one or more of the devices in the system 1200 (e.g., the camera devices 1204, the server 1208, the computing device 1212) are operable to detect its location and determine whether that location has changed, in the process element 1276. For example, the camera devices 1204 may employ GPS and report their locations to the server 1208 such that the server 1208 can generate a geo-map 1230. Then, if any of the camera devices 1204 move outside of the boundary of the geo-map 1230 (process element 1278), the server 1208 may disable the camera device 1204, in the process element 1278. Alternatively or additionally, any or each of the devices of the system 1200 may be able to determine whether it has moved outside of the boundary of the geo-map 1230 such that a determination of disablement can be made. If the location of the device has not changed, the camera devices 1204 may continue capturing images and transferring them to the server 1208 such that the computing device 1212 can vet them for display until the event is over, in the process element 1282. That is, the process 1250 may continue through the process elements 1258 through 1280 until the event is over.

Disabling a device may include locking the device and/or powering down the device such that it may only be opened with a passcode. Other forms of disablement include encrypting at least the images maintained within the capture devices 1204, the server 1208, and/or the computing device 1212. In embodiments employing the wireless router 1206, the server 1208 may generate a disablement signal for transfer to the device that is moved outside the boundary of the geo-map 1230. For example, the wireless router 1206 may employ Wi-Fi signaling. And, a packet structure of the Wi-Fi signaling may include flags that may be used to direct the moving device to disable. In this regard, when the server 1208 detects that a camera device 1204 has moved outside the boundary of the geo-map 1230, the server 1208 may configure a flag in the Wi-Fi packet structure that directs the camera device 1204 to disable when received by the camera device 1204.

In this regard, the wireless router 1206 may provide a certain signal strength that is sufficient to provide Wi-Fi signaling to an area greater than the area of the geo-map 1230. In some embodiments, the geo-map 1230 is generated based in part on the Wi-Fi signaling strength of the wireless router 1206. For example, if the wireless router 1206 is operable to provide Wi-Fi signaling coverage for an area of 300 square feet, the server 1208 may generate a geo-map 1230 that is less than or equal to the shape and size of Wi-Fi signaling coverage of the wireless router 1206 (i.e., within the boundaries of the Wi-Fi signaling coverage). In some embodiments, the server 1208 may generate the geo-map 1230 before the camera devices 1204 report their locations such that the camera devices 1204 may be established within the boundaries of the geo-map 1230. That is, stationary camera devices 1204 may be set up according to the geo-map 1230 before the camera devices 1204 are operable to report their locations.

Figure 19B:
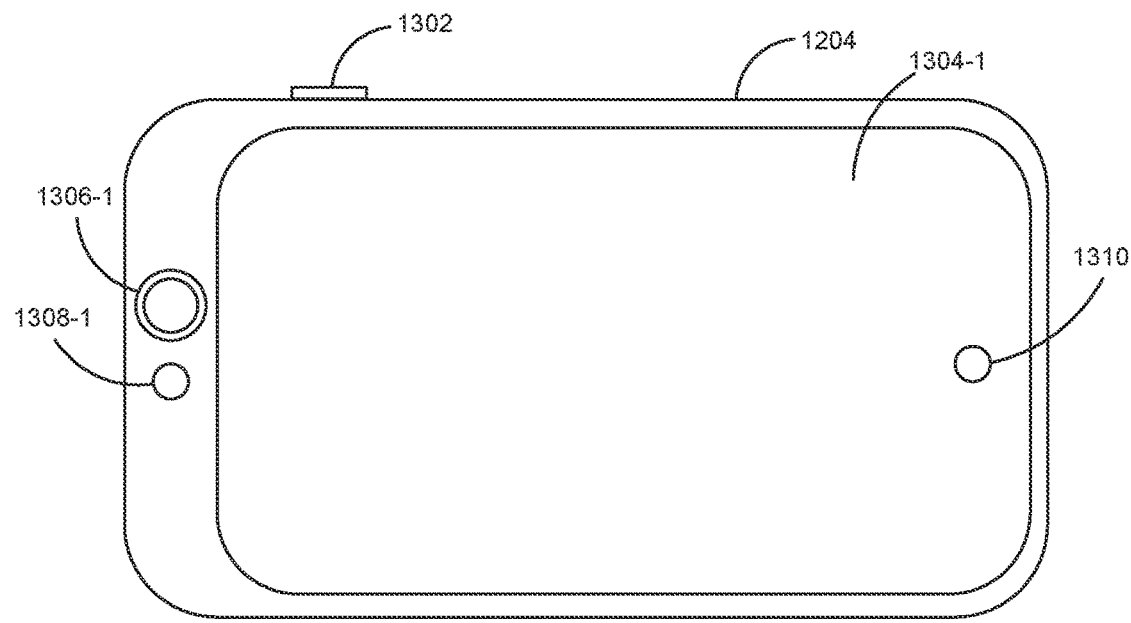
FIGS. 19A and 19B illustrate an exemplary camera device that may be used in any of the embodiments herein.
Figure 19A:
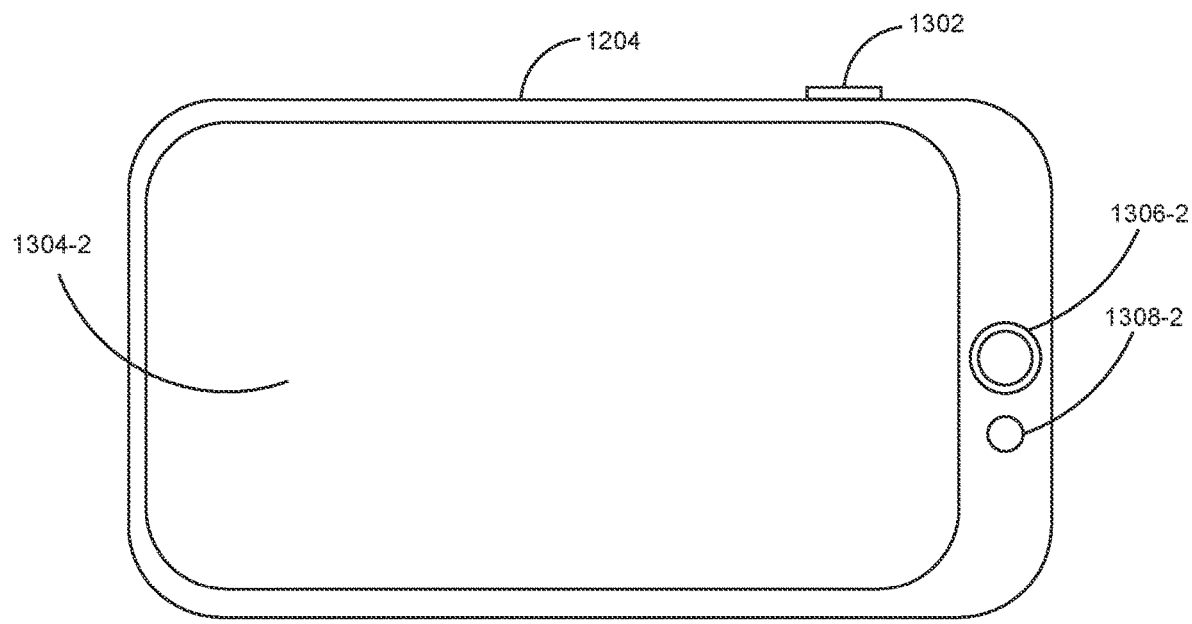

FIGS. 19A and 19B are block diagrams of one exemplary camera device 1204. In this embodiment, the camera device 1204 is a dual interface camera device. That is, the camera device 1204 may be configured with a touchscreen interface (i.e., touchscreen interfaces 1304-1 and 1304-2) on each side of the camera device 1204. Thus, each side of the camera device 1204 may be operable to provide user accessible software modules, or "apps", to a user, like typical smart phones with a touchscreen interface on a single side. And, being a camera device, the camera device 1204 may be configured with a camera lens 1306 on each side of the camera device 1204 (i.e., the camera lenses 1306-1 and 1306-2) as well as flash modules 1308-1 and 1308-2 for lowlight imagery. Of course, the camera device 1204 may be configured with additional lenses 1306 on each side of the device. And, each side of the camera device 1204 may provide the same or similar resolution. The camera device 1204 may also be configured with a power button 1302 operable to turn the device on and off. The camera device 1204 may also include a home button 1310 for providing various forms of functional control of the camera device 1204.

As mentioned, in some embodiments, the camera device 1204 may be operable to use facial recognition to detect when one or more persons (e.g., attendees of the event) are within view of either or both of the camera lenses 1306-1 and 1306-2. The camera device 1204 may then display a countdown on the corresponding interface 1304 allowing the person or persons time to pose for the picture. Then, after the countdown, the camera device 1204 may automatically capture the image of the person or persons.

In some embodiments, because there is a touchscreen interface 1304 on both sides of the camera device 1204, one side of camera device 1204 can display a "selfie view" to the camera device 1204's subject while the other side of the camera device 1204 can display both a picture of the subject and controls for the capturing the subject.

In some embodiments, the stationary camera devices 1204 are controlled by the server 1208 and/or by software configured with the camera devices 1204 themselves. However, these camera devices 1204 may be at least partially controlled by attendees of the event. And, the mobile camera devices 1204 may be operable to provide more control to attendees at the event.

Figure 20:
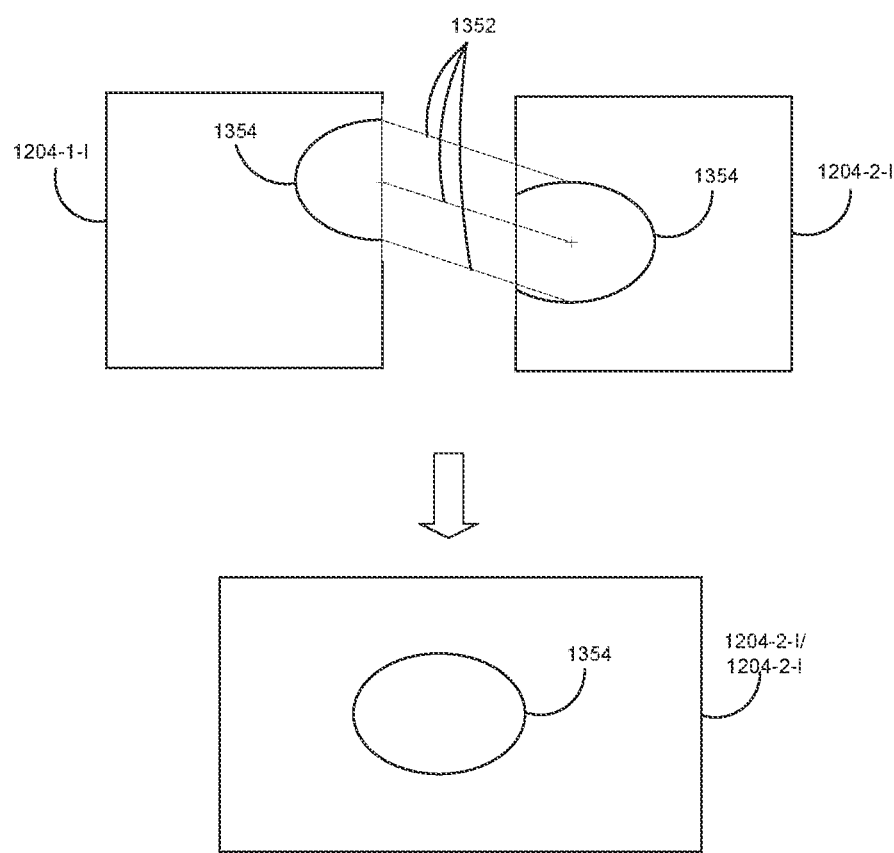
FIG. 20 is a block diagram of an exemplary image stitching process that may be employed by any of the embodiments herein.

FIG. 20 illustrates how the server 1208 may be operable to stitch together images from multiple camera devices 1204. In this embodiment, an image 1204-1-I is captured from the camera device 1204-1 and another image 1204-2-I is captured from the camera device 1204-2. When the server 1208 receives these images, the module 1214 configured with the server 1208 may identify a feature 1354 that is common to both of the images 1204-1-I and 1204-2-I. The server 1208 may then align the feature 1354 in each of the images 1204-1-I and 1204-2-I by finding similar points along the lines 1352 in the feature 1354. As mentioned, the module 1214 may also adjust for scale, parallax, contrast, lighting, etc. Once the image stitching is complete, the module 1214 may output a single image 1204-1-I/1204-2-I with the feature 1354. It should be noted that the number of images 1204 that are stitched together is not intended to be limited to any particular number.

Figure 21:
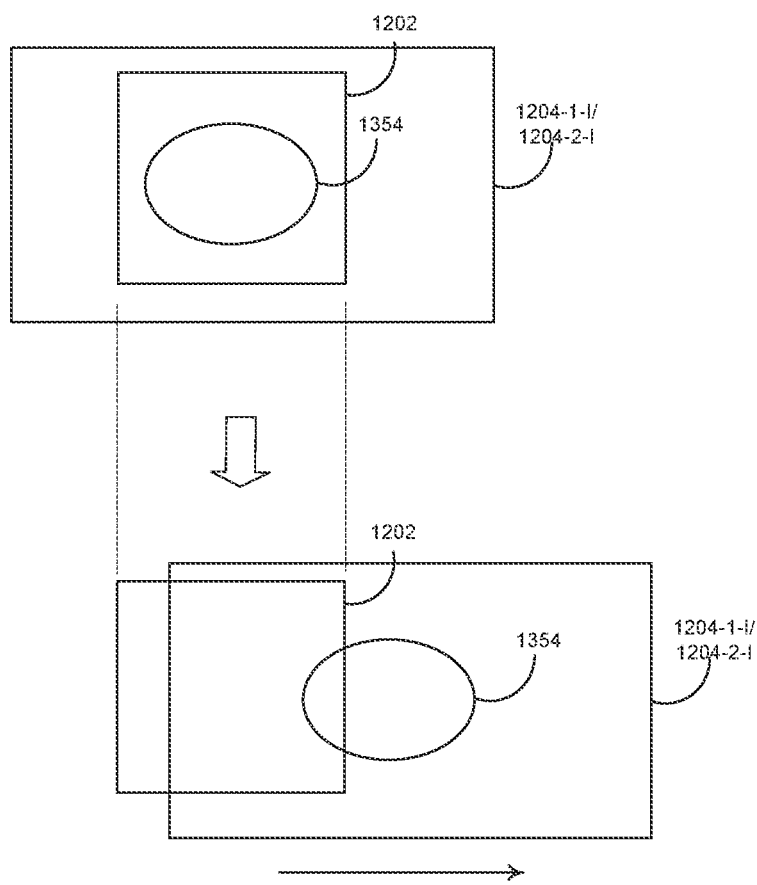
FIG. 21 is a block diagram of an exemplary image transition process that may be employed by any of the embodiments herein.

In some embodiments, the module 1214 may be operable to impart certain visual effects on an image. For example, FIG. 21 illustrates an embodiment where the image 1204-1-I/1204-2-I that was generated by image stitching may be transitioned over time through the display device 1202. To illustrate, the image 1204-1-I/1204-2-I may be scaled to a size that prominently displays the feature 1354 within the "window" size of the display device 1202. The server may then transition the feature over time through the window of the display device 1202. Other effects may also be implemented such as having an image "dissolve" on the display device 1202, having the image wipe away on the display device 1202, having the image zoom out and/or zoom in, displaying multiple images at the same time, etc.

Figure 22:
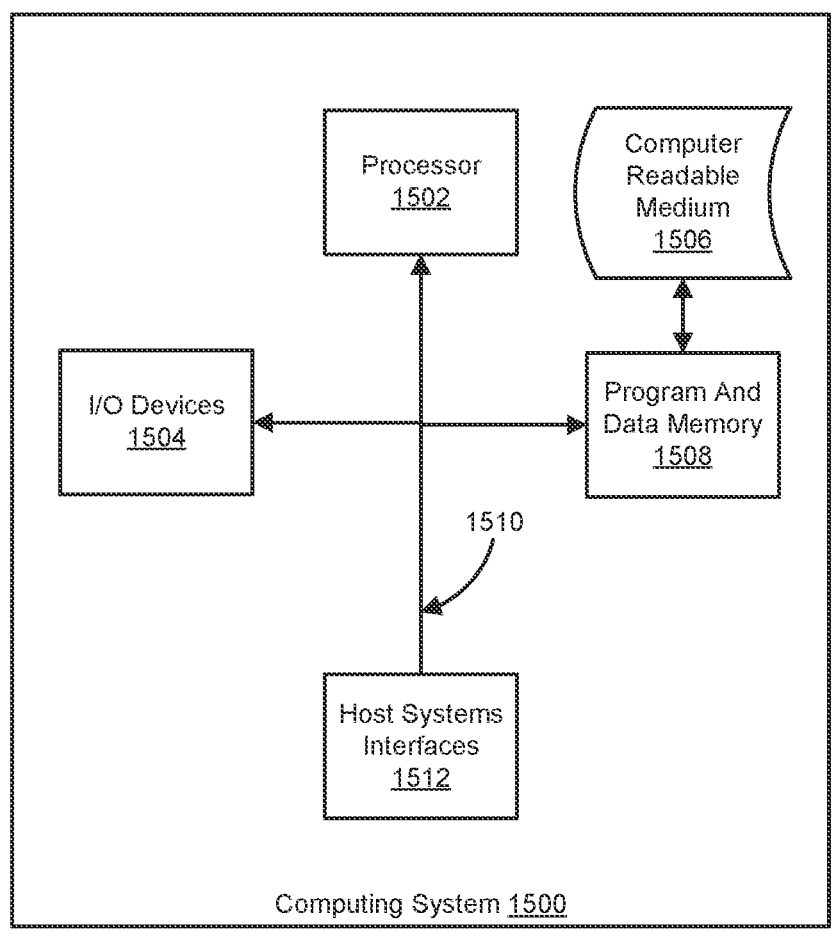
FIG. 22 is a block diagram of an exemplary computing system in which a computer readable medium provides instructions for performing one or more methods herein.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements. FIG. 22 illustrates a computing system 1500 in which a computer readable medium 1506 may provide instructions for performing any of the methods disclosed herein.

Furthermore, some aspects of the embodiments herein can take the form of a computer program product accessible from the computer readable medium 1506 to provide program code for use by or in connection with a computer or any instruction execution system. For the purposes of this description, the computer readable medium 1506 can be any apparatus that can tangibly store the program code for use by or in connection with the instruction execution system, apparatus, or device, including the computing system 1500.

The computer readable medium 1506 can be any tangible electronic, magnetic, optical, electromagnetic, infrared, or semiconductor system (or apparatus or device). Some examples of a computer readable medium 1506 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 1500 can include one or more processors 1502 coupled directly or indirectly to memory 1508 through a system bus 1510. Additionally, the computing system 1500 may have one or more cameras and/or sensors coupled to the processor(s) 1502 to perform in accordance with the embodiments disclosed hereinabove. The memory 1508 can include local memory employed during actual execution of the program code, bulk storage, and/or cache memories, which provide temporary storage of at least some of the program code in order to reduce the number of times the code is retrieved from bulk storage during execution.

Input/output (I/O) devices 1504 (including but not limited to keyboards, displays, pointing devices, I/O interfaces, etc.) can be coupled to the computing system 1500 either directly or through intervening I/O controllers. Network adapters may also be coupled to the computing system 1500 to enable the computing system 1500 to couple to other data processing systems, such as through host systems interfaces 1512, printers, and/or or storage devices through intervening private or public networks. Modems, cable modems, and Ethernet cards are just a examples of network adapter types.

The foregoing description illustrates various embodiments along with examples of how aspects of the systems may be implemented. The above examples and embodiments should not be deemed to be the only embodiments, and are presented to illustrate the flexibility and advantages of the systems and methods. In the figures, similar symbols typically identify similar components, unless context dictates otherwise. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the sequence diagrams and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the diagrams, scenarios, and flow charts discussed herein, and these diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). Functional aspects described as modules need not be arranged or stored as a unit, and may include instructions, routines or program code distributed, stored and executed in any manner. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, flash memory, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All citations and references, including without limitation references to web sites, are incorporated by reference herein in their entireties as if fully set out within the application.

What is claimed is:

1. A system, comprising:
   a computing device;
   a display device;
   a plurality of camera devices, each camera device being configured at a location of an event and comprising a global positioning module (GPS) operable to identify the camera device's location;
   a wireless router; and
   a server communicatively coupled to the computing device, the display device, and the camera devices through the wireless router using a secure wireless protocol that establishes a secure local area network (LAN) to prevent intrusion to the computing device, the display device, the camera devices, and the server by devices or systems that are external to the LAN,
   wherein the server is operable to receive images captured by the camera devices over the LAN, to compress the images, and to transfer the compressed images to the computing device for vetting, and to display vetted images on the display device, and
   wherein the server is further operable to detect activity at the event based on a number of images being captured by a first of the camera devices, to direct at least a portion of the camera devices of the plurality to automatically capture an image of a scene of the activity, to identify a feature in the images of the scene captured by the portion of the camera devices, to stitch the images of the scene into a single image, to transfer the single image to the computing device for vetting, and to display the single image on the display device during the event after vetting by the computing device.

2. The system of claim 1, wherein:
the server is further operable to display the single image on the display device by transitioning through the single image over time.

3. The system of claim 1, wherein:
the server is further operable to detect a change in the location of the first camera device, to determine that the change in the location of the first camera device is unauthorized, and to disable to the first camera device based on the determination, wherein disabling includes encrypting at least the images of the first camera device.

4. The system of claim 1, wherein:
the server is further operable to receive location information from each of the camera devices, and to establish a geo-map of the camera devices based on the received location, wherein the geo-map is operable to disable at least one of the camera devices, the server, or the computing device when the at least one of the camera devices, the server, or the computing device moves to locations outside of the geo-map.

5. The system of claim 1, wherein:
at least a portion of the camera devices are dual interface camera devices having two sides with each side comprising a touch screen interface and a camera.

6. The system of claim 1, wherein:
the first camera device is operable to identify when a person at the event is in view of the first camera device via a facial recognition module configured with the first camera device, to initiate a countdown upon identifying the person, and to automatically capture an image of the person after the countdown.

7. The system of claim 6, wherein:
the first camera device is further operable to display the image of the person after the countdown; and
the facial recognition module is further operable to detect an expression of the person that indicates that the image of the person can be published and/or printed.

8. The system of claim 1, wherein:
the server is operable to implement a background process that monitors the first camera device via a heartbeat connection to the first camera device.

9. A method, comprising:
configuring each of a plurality of camera devices unique locations of an event, each camera device comprising a global positioning module (GPS) operable to identify the camera device's location;
establishing a wireless router;

communicatively coupling a server to a computing device, a display device, and the camera devices through the wireless router using a secure wireless protocol that establishes a secure local area network (LAN) to prevent intrusion to the computing device, the display device, the camera devices, and the server by devices or systems that are external to the LAN;

receiving, at the server, images captured by the camera devices over the LAN;

compressing the images;

transferring the compressed images to the computing device for vetting;

displaying vetted images on the display device;

detecting activity at the event based on a number of images being captured by a first of the camera devices;

directing at least a portion of the camera devices of the plurality to automatically capture an image of a scene of the activity;

identifying a feature in the images of the scene captured by the portion of the camera devices;

stitching the images of the scene into a single image;

transferring the single image to the computing device for vetting; and displaying the single image on the display device during the event after vetting by the computing device.

10. The method of claim 9, further comprising:
displaying the single image on the display device by transitioning through the single image over time.

11. The method of claim 9, further comprising:
detecting a change in the location of the first camera device;
determining that the change in the location of the first camera device is unauthorized; and
disabling the first camera device based on the determination, wherein disabling includes encrypting at least the images of the first camera device.

12. The method of claim 9, further comprising:
at the server:
receiving location information from each of the camera devices;
establishing a geo-map of the camera devices based on the received location; and
disabling at least one of the camera devices, the server, or the computing device when the at least one of the camera devices, the server, or the computing device moves to locations outside of the geo-map.

13. The method of claim 9, wherein:
at least a portion of the camera devices are dual interface camera devices having two sides with each side comprising a touch screen interface and a camera.

14. The method of claim 9, further comprising:
identifying when a person at the event is in view of the first camera device via a facial recognition module configured with the first camera device; and
initiating a countdown upon identifying the person, and to automatically capture an image of the person after the countdown.

15. The method of claim 14, further comprising, with the first camera device:
displaying the image of the person after the countdown; and
detecting an expression of the person that indicates that the image of the person can be published and/or printed.

16. The method of claim 8, further comprising:
a background process on the server that monitors the first camera device via a heartbeat connection to the first camera device.

* * * * *